(12) United States Patent
Xue et al.

(10) Patent No.: US 11,737,142 B2
(45) Date of Patent: Aug. 22, 2023

(54) EFFECTIVE CONTENTION WINDOWS FOR NEW RADIO SIDELINK OVER UNLICENSED BANDS

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US); Shuanshuan Wu, San Diego, CA (US); Peter Gaal, San Diego, CA (US); Ozcan Ozturk, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/443,241

(22) Filed: Jul. 22, 2021

(65) Prior Publication Data

US 2022/0070935 A1 Mar. 3, 2022

Related U.S. Application Data

(60) Provisional application No. 62/706,628, filed on Aug. 28, 2020.

(51) Int. Cl.
*H04W 74/08* (2009.01)
*H04L 1/1812* (2023.01)
(Continued)

(52) U.S. Cl.
CPC ....... *H04W 74/0816* (2013.01); *H04L 1/1819* (2013.01); *H04W 72/02* (2013.01); *H04W 74/002* (2013.01); *H04W 80/02* (2013.01)

(58) Field of Classification Search
CPC ............. H04W 74/0816; H04W 72/02; H04W 74/002; H04W 80/02; H04W 16/14;
(Continued)

(56) References Cited

U.S. PATENT DOCUMENTS

| | | | |
|---|---|---|---|
| 2018/0070252 A1* | 3/2018 | Gupta | H04W 24/08 |
| 2018/0176955 A1* | 6/2018 | Salem | H04L 1/1812 |
| 2021/0306111 A1* | 9/2021 | Jung | H04L 1/1671 |

FOREIGN PATENT DOCUMENTS

WO WO-2020085885 A1 4/2020

OTHER PUBLICATIONS

ASUSTEK: "Remaining Issues on Sidelink Physical Layer Procedure on NR V2X", 3GPP TSG RAN WG1 #100bis, 3GPP Draft, R1-2002473, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 10, 2020 (Apr. 10, 2020), XP051873575, 13 Pages, Retrieved from the Internet: URL: https://www.3gpp.org/ftp/TSG_RAN/WG1_RL1/TSGR1_100b_e/Docs/R1-2002473.zip, [Retrieved on Apr. 10, 2020], Sections 1-3.

(Continued)

*Primary Examiner* — Afshawn M Towfighi
(74) *Attorney, Agent, or Firm* — Harrity & Harrity, LLP

(57) ABSTRACT

Various aspects of the present disclosure generally relate to wireless communication. In some aspects, a user equipment (UE) may select, for a sidelink transmission over an unlicensed band and associated with a medium access control (MAC) protocol data unit (PDU), one or more candidate resources of a set of candidate resources that are within an adaptive effective contention window (ECW). The UE may adjust at least one parameter of the adaptive ECW to determine an adjusted at least one parameter based at least in part on a channel access output associated with the one or more candidate resources. The UE may transmit the MAC (Continued)

PDU using the one or more candidate resources or an additional one or more candidate resources, wherein the additional one or more candidate resources are selected based at least in part on the adjusted at least one parameter. Numerous other aspects are provided.

31 Claims, 10 Drawing Sheets

(51) Int. Cl.
    *H04W 72/02*     (2009.01)
    *H04W 74/00*     (2009.01)
    *H04W 80/02*     (2009.01)

(58) Field of Classification Search
    CPC . H04W 76/14; H04W 74/0833; H04W 92/18; H04W 74/0808; H04L 1/1819; H04L 1/1854; H04L 1/1887; H04L 5/001; H04L 5/0053; H04L 5/0094
See application file for complete search history.

(56) References Cited

OTHER PUBLICATIONS

International Search Report and Written Opinion—PCT/US2021/070946—ISA/EPO—dated Nov. 16, 2021.
ZTE., et al., "Discussion on AS Level Link Management for Unicast", 3GPP TSG RAN WG1 #97, 3GPP Draft, R1-1906481 Discussion on AS Level Link Management for Unicast, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), pp. 1-3, XP051727931, Retrieved from the Internet: URL: https://www.3gpp.org/ftp/tsg_ran/WG1_RL1/TSGR1_97/Docs/R1-1906481.zip, [retrieved on May 13, 2019], Sections 1-3.

* cited by examiner

EFFECTIVE CONTENTION WINDOWS FOR NEW RADIO SIDELINK OVER UNLICENSED BANDS

CROSS-REFERENCE TO RELATED APPLICATION

This Patent application claims priority to U.S. Provisional Patent Application No. 62/706,628, filed on Aug. 28, 2020, entitled "EFFECTIVE CONTENTION WINDOWS FOR NEW RADIO SIDELINK OVER UNLICENSED BANDS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for effective contention windows for New Radio sidelink over unlicensed bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes selecting, for a sidelink transmission over an unlicensed band and associated with a medium access control (MAC) protocol data unit (PDU), one or more candidate resources of a set of candidate resources that are within an adaptive effective contention window (ECW); adjusting at least one parameter of the adaptive ECW to determine an adjusted at least one parameter based at least in part on a channel access output associated with the one or more candidate resources; and transmitting the MAC PDU using the one or more candidate resources or an additional one or more candidate resources, wherein the additional one or more candidate resources are selected based at least in part on the adjusted at least one parameter.

In some aspects, a UE for wireless communication includes a memory and one or more processors coupled to the memory, the memory and the one or more processors configured to select, for a sidelink transmission over an unlicensed band and associated with a MAC protocol data unit PDU, one or more candidate resources of a set of candidate resources that are within an adaptive ECW; adjust at least one parameter of the adaptive ECW to determine an adjusted at least one parameter based at least in part on a channel access output associated with the one or more candidate resources; and transmit the MAC PDU using the one or more candidate resources or an additional one or more candidate resources, wherein the additional one or more candidate resources are selected based at least in part on the adjusted at least one parameter.

In some aspects, a non-transitory computer-readable medium storing a set of instructions for wireless communication includes one or more instructions that, when executed by one or more processors of a user equipment UE, cause the UE to select, for a sidelink transmission over an unlicensed band and associated with a MAC PDU, one or more candidate resources of a set of candidate resources that are within an adaptive ECW; adjust at least one parameter of the adaptive ECW to determine an adjusted at least one parameter based at least in part on a channel access output associated with the one or more candidate resources; and transmit the MAC PDU using the one or more candidate resources or an additional one or more candidate resources, wherein the additional one or more candidate resources are selected based at least in part on the adjusted at least one parameter.

In some aspects, an apparatus for wireless communication includes means for selecting, for a sidelink transmission over an unlicensed band and associated with a MAC PDU, one or more candidate resources of a set of candidate resources that are within an adaptive ECW; means for adjusting at least one parameter of the adaptive ECW to determine an adjusted at least one parameter based at least in part on a channel access output associated with the one or more candidate resources; and means for transmitting the MAC PDU using the one or more candidate resources or an additional one or more candidate resources, wherein the additional one or more candidate resources are selected based at least in part on the adjusted at least one parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
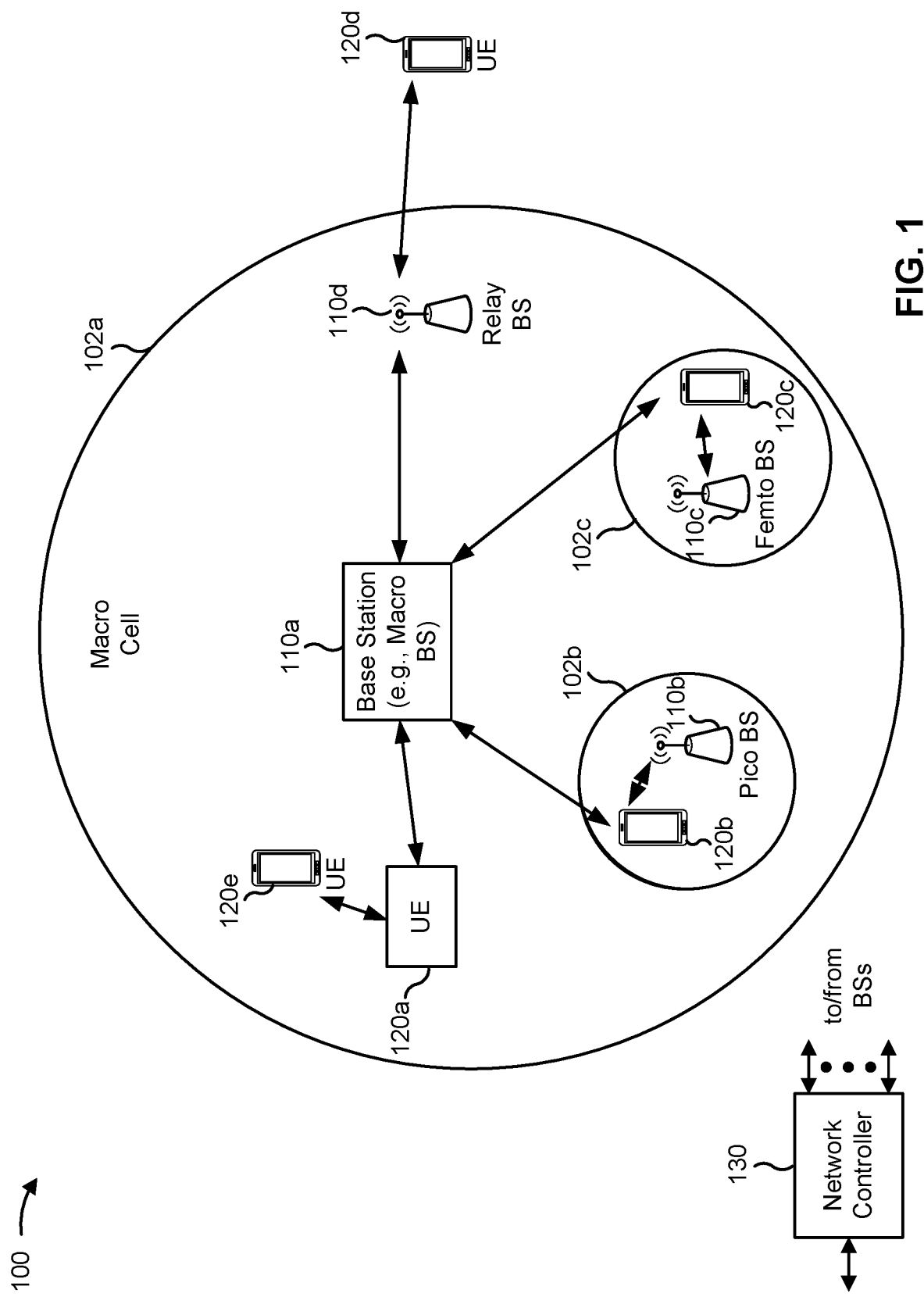
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
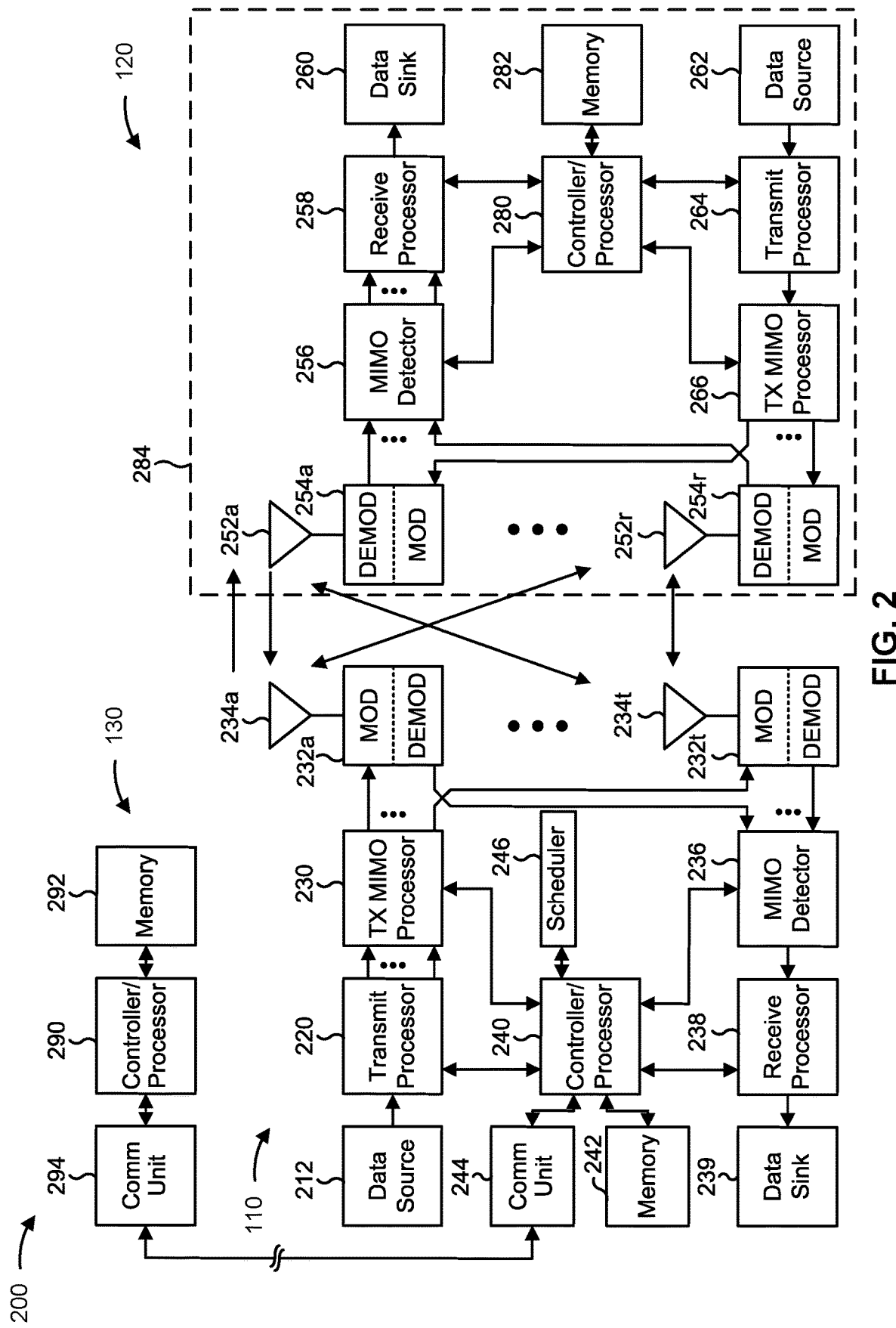
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with effective contention windows (ECWs) for New Radio (NR) sidelink over unlicensed bands, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for selecting, for a sidelink transmission over an unlicensed band and associated with a medium access control (MAC) protocol data unit (PDU), one or more candidate resources of a set of candidate resources that are within an adaptive effective contention window (ECW), means for adjusting at least one parameter of the adaptive ECW to determine an adjusted at least one parameter based at least in part on a channel access output associated with the one or more candidate resources, means for transmitting the MAC PDU using the one or more candidate resources or an additional one or more candidate resources, wherein the additional one or more candidate resources are selected based at least in part on the adjusted at least one parameter, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
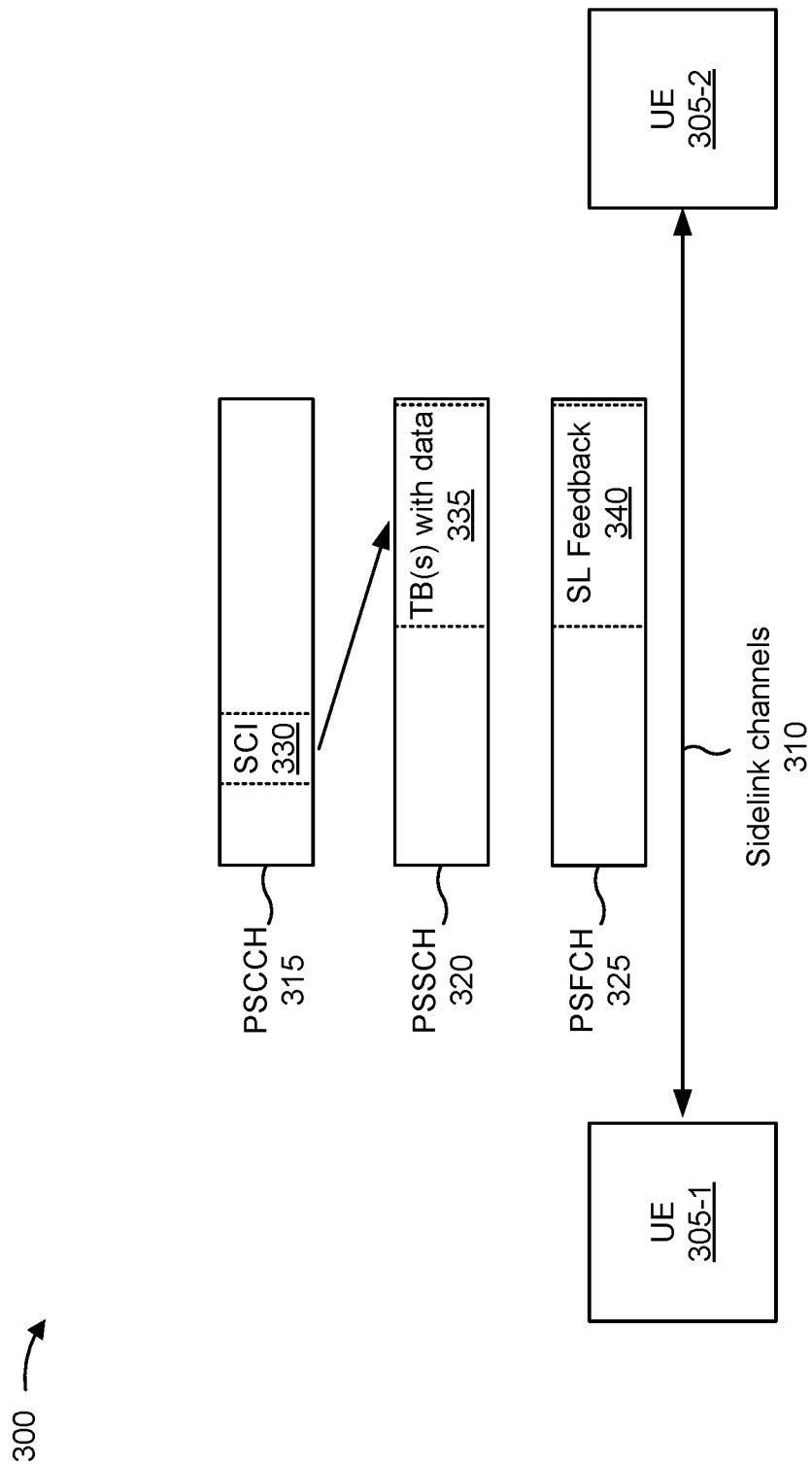
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
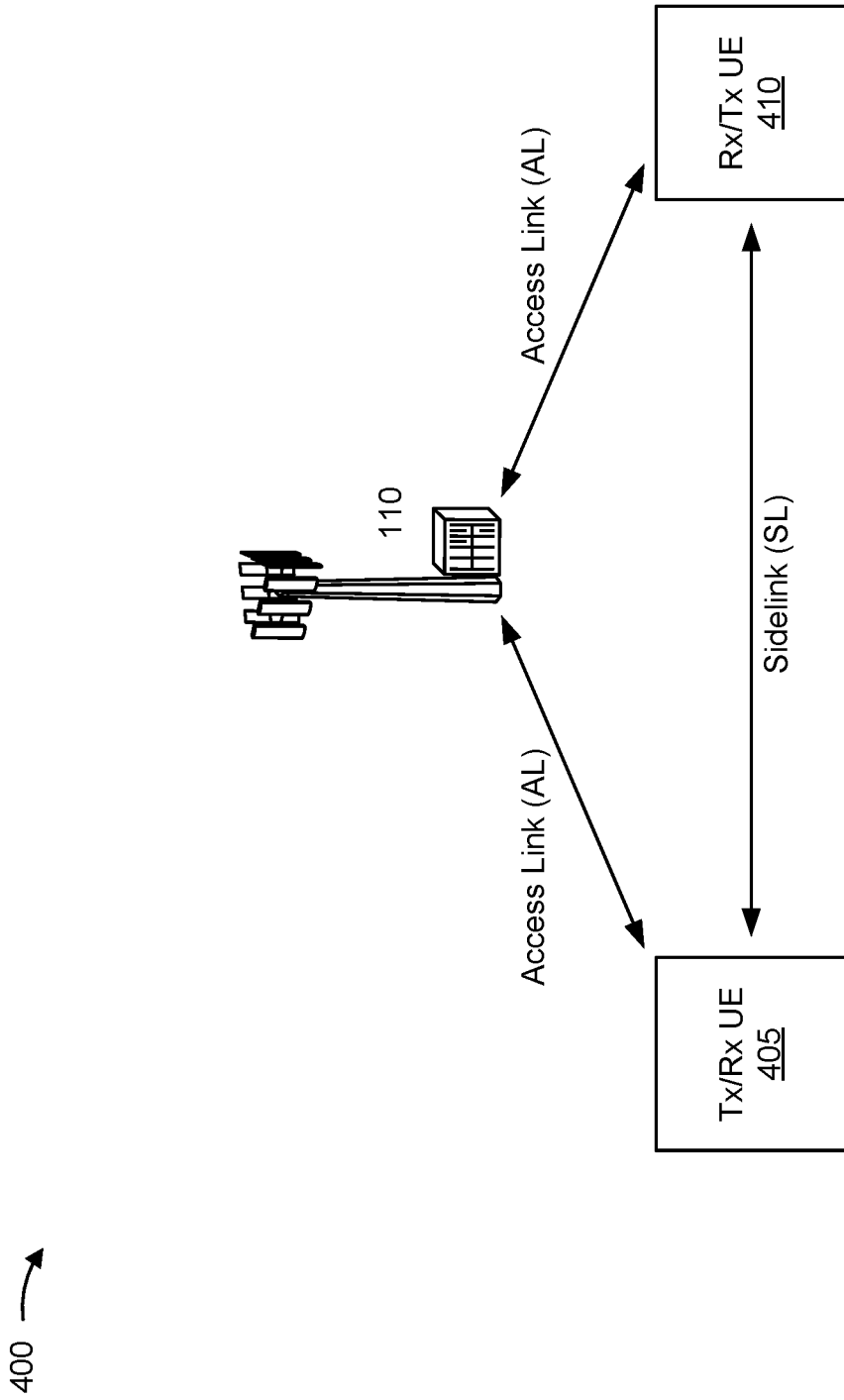
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
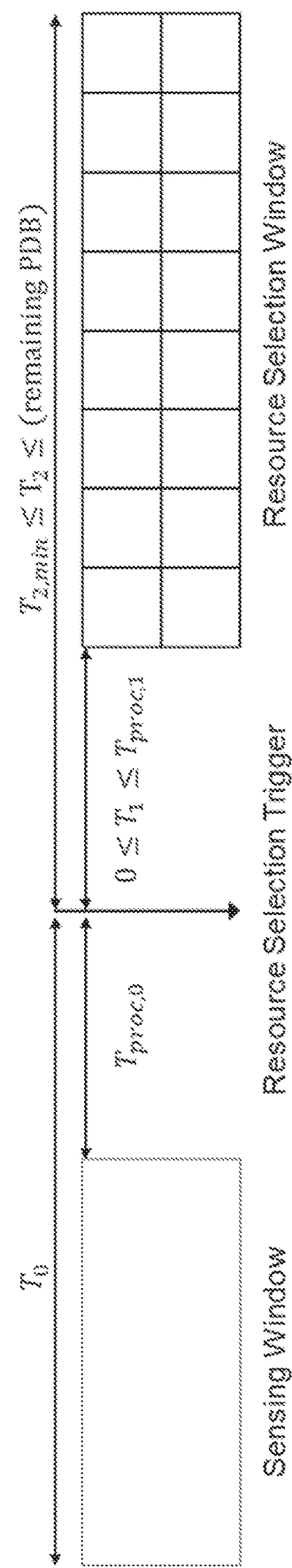
FIG. 5 is a diagram illustrating an example of resource selection for sidelink, in accordance with the present disclosure.

FIG. 5 is a diagram illustrating an example 500 of resource selection for sidelink, in accordance with the present disclosure. The example 500 shows a scheme for sensing a sidelink channel, based on a resource selection window, for selecting resources for a sidelink communication.

As shown in FIG. 5, a UE may perform a sensing procedure in a sensing window. In some cases, the sensing window may be 100 milliseconds (ms) (e.g., for aperiodic resource reservation, such as aperiodic reservation in one or more slots of up to 32 logical slots in the future) or 1100 ms (e.g., for periodic resource reservation). In some cases, a UE configured for communication in an NR network may use a sensing procedure for aperiodic or periodic resource reservation.

According to the sensing procedure, the UE may decode control messages relating to resource reservations of other UEs, as well as perform measurements (e.g., RSRP measurements) associated with one or more sidelink channels. For example, UEs may transmit reservation information (e.g., in SCI) that indicates a resource reservation for a current slot (e.g., the slot in which the reservation information is transmitted) and for one or more (e.g., up to two) future slots. A resource allocation associated with a resource reservation may be one or more sub-channels in a frequency domain and one slot in a time domain. In some cases, a resource reservation may be aperiodic or periodic. In periodic resource reservation, a UE may signal (e.g., in the reservation information in SCI) a period for the resource reservation (e.g., a value between 0 ms and 1000 ms). In some cases, the sensing procedure may be performed by a physical layer of the UE based on a request from a medium access control (MAC) layer of the UE.

As shown in FIG. 5, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in a resource selection window (RSW). That is, the UE may determine the one or more available resources based at least in part on the sensing procedure performed by the UE. For example, the sensing procedure may provide an indication of candidate resources in the RSW that are occupied and/or resources in the RSW associated with high interference.

The physical layer of the UE can report the set of candidate resources to the MAC layer of the UE. The MAC layer randomly chooses for transmission one or more resources of the set of candidate resources reported. In some cases, the UE may be reserving resources for a hybrid automatic request response (HARQ) transmission and/or retransmission, and the resources for multiple physical sidelink shared channels (PSSCHs) for the same transmission block may be randomly selected by the MAC layer.

The RSW shown in FIG. 5 may be defined by a first time period, T1, and a second time period, T2. In some cases, if a resource selection trigger occurs in a subframe n, the resource selection window is from n+T$_1$ to n+T$_2$. In this case, T$_1$ may be less than a processing time (T$_{proc,1}$). Moreover, T$_2$ may be greater than or equal to T$_{2,min}$, which may be a value configured for the UE based at least in part on a priority of the UE, and less than or equal to 100 or a remaining packet delay budget (PDB) of the UE (e.g., T$_2$ may be less than or equal to a remaining PDB).

A PDB is a constraint dictating a maximum delay between a time of packet arrival and a time of a last transmission of the packet. For example, each packet that arrives at a transmitter of a UE for transmission by the transmitter is associated with a PDB and a quantity of transmissions (a quantity of times that the packet is to be transmitted). The PDB and the quantity of transmissions may vary among packets depending on, for example, an application or a service associated with the packet (e.g., in order to achieve a desired coverage, range, reliability, and/or the like).

Some aspects described herein related to an unlicensed radio frequency spectrum band, which may be used for communications in a wireless network, such as wireless network 100. In some aspects, the unlicensed radio frequency spectrum band may be used by base stations 110 and UEs 120 of a cellular network for cellular communications (e.g., NR communications), and by Wi-Fi access points and Wi-Fi stations of a Wi-Fi network for Wi-Fi communications. The unlicensed radio frequency spectrum band may be used in the cellular network in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

Prior to gaining access to, and communicating over, an unlicensed radio frequency spectrum band, a UE may perform a listen-before-talk (LBT) procedure to contend for access to the unlicensed radio frequency spectrum band. An LBT procedure may include determining a channel busy ratio (CBR) to determine whether a channel of the unlicensed radio frequency spectrum band is available. The UE may use a pre-configured mapping from CBR to channel usage ratio (CR) to self-regulate channel access attempts, to avoid heavy congestion and contention in a system. The UE may perform fewer channel access attempts when the estimated CBR value is high.

In some cases, the presence of interference associated with the NR RAT from one or more other RATs can result in erroneous CBR estimates. For example, a sub-channel can be detected as "busy" in a CBR estimate when it is in fact occupied by one or more other RATs. Consequently, a typical case of a CBR based congestion control may break down. If a UE reacts to erroneous CBR, the UE can be starved by the other RAT or RATs. In addition, the robustness of CBR based congestion control can be frequently challenged due to a strong inter sub-channel leakage that can occur, especially for low-complexity receiver implementations. In some environments, a UE may be starved of access to a channel of an unlicensed radio frequency spectrum band due to activity of another RAT, such as Wi-Fi.

In some cases, with regard to some RATs, a UE adopts load-based equipment (LBE) channel access, of which the main channel access engine has a contention management scheme designed to manage channel access. In LBE, after observing one or more lost packets as a possible symptom of congestion, an LBE code can double its contention window (CW) to cool down channel access contention. However, as a node in a synchronous system, a UE cannot fully operate like an LBE node, and a UE cannot solely rely on LBE CW control for contention/congestion management.

In some cases, the RSW can be understood as a preliminary contention window (CW) for an NR sidelink autonomous sensing procedure. In some cases, the physical layer may filter the candidate resources to report only available resources to the MAC level. A slot index randomly selected by the MAC layer from the filtered RSW can be understood as a random number for a listen-before-talk (LBT) counter. In general, the smaller the slot indices selected by UEs near one another, the shorter the latency in channel access. However, smaller slot indices may increase risk of collision and/or congestion. There is currently no adaptive management for collision and/or congestion associated with the preliminary CW in NR sidelink, because collision and/or congestion is managed using the CBR mechanism described above. However, as described above, the CBR mechanism may not work well in unlicensed bands.

According to some aspects of techniques and apparatuses described herein, a UE may be configured with effective contention windows (ECWs) for NR sidelink over unlicensed band. The ECWs may serve as an effective CW based congestion/contention control mechanism for a sensing procedure for resource selection. In some aspects, techniques and apparatuses described herein may include selecting one or more candidate resources of a set of candidate resources that are within an adaptive ECW. A channel access attempt may be performed and the UE may adjust at least one parameter of the adaptive ECW to determine an adjusted at least one parameter of the adaptive ECW. The UE may adjust the at least one parameter based at least in part on a channel access output associated with the one or more candidate resources. The UE may transmit a MAC PDU using the one or more candidate resources or an additional one or more candidate resources. The additional one or more candidate resources may be selected based at least in part on the adjusted at least one parameter.

In some aspects, the adaptive ECW may be configured to facilitate resource selection in the autonomous sensing procedure of NR sidelink Mode 2 when operating in the unlicensed band. Aspects may enable adaptive ECW management according to channel access output at the chosen sidelink resource. For example, the UE may increase the adaptive ECW for a channel access failure, and may decrease the adaptive ECW when channel access is successful. In this way, aspects may provide an adaptive resource selection scheme that can enable adjustment to an ECW responsive to channel access outputs. As a result, aspects of the techniques and apparatuses described herein may increase channel access reliability in sidelink over unlicensed bands, increase efficiency of sidelink communications over unlicensed bands, and reduce collisions of sidelink communications over unlicensed bands.

As indicated above, FIG. 5 is provided as an example. Other examples may differ from what is described with respect to FIG. 5.

Figure 6:
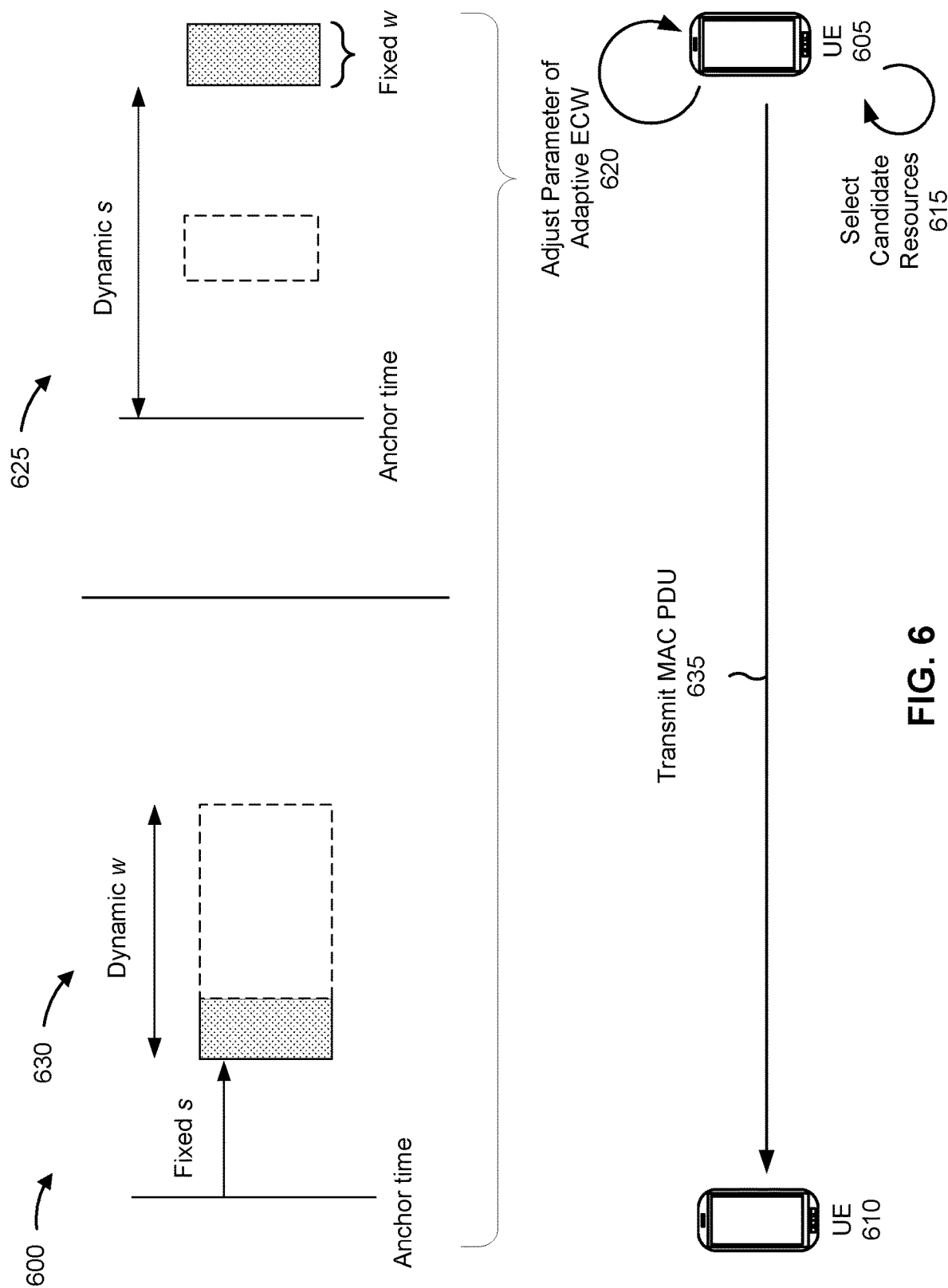
FIGS. 6-8 are diagrams illustrating examples associated with effective contention windows (ECWs) for New Radio (NR) sidelink over unlicensed bands, in accordance with the present disclosure.

FIG. 6 is a diagram illustrating an example 600 associated with ECWs for NR sidelink over unlicensed bands, in accordance with the present disclosure. As shown in FIG. 6, a UE 605 and a UE 610 may communicate with one another via a sidelink. The UE 605 and/or the UE 610 may be, be similar to, include, or be included in the UE 120 shown in FIG. 1.

As show by reference number 615, the UE 605 may select one or more candidate resources of a set of candidate resources that are within an adaptive ECW. The UE 605 may select the one or more candidate resources for a sidelink transmission over an unlicensed band. The sidelink transmission may be associated with a MAC protocol data unit (PDU). The UE 605 may select the one or more candidate resources randomly from the set of candidate resources that are within the adaptive ECW.

Figure 7:
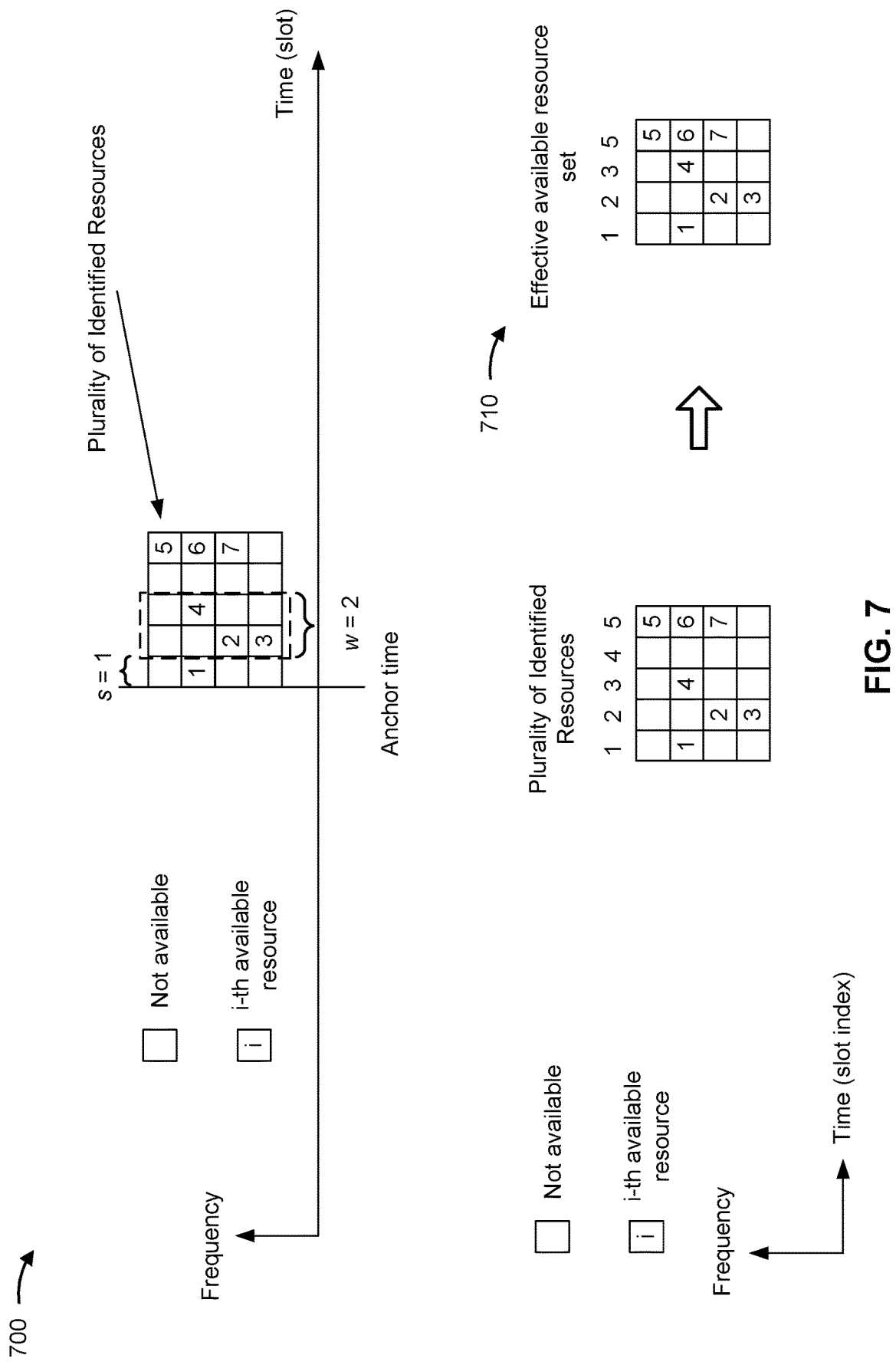

The UE 605 may use a physical layer to determine the set of candidate resources and a MAC layer to select the one or more candidate resources from the set. The physical layer of the UE 605 may determine the set of candidate resources based at least in part on a sensing operation performed by a physical layer. As shown in FIG. 7 and described below in connection with FIG. 7, the set of candidate resources may include an effective available resource set. The effective available resource set may include a subset of a plurality of identified resources within a resource selection window that are available.

As show by reference number 620, the UE 605 may adjust at least one parameter of the adaptive ECW to determine an adjusted at least one parameter. The UE 605 may adjust the at least one parameter based at least in part on a channel access output associated with the one or more candidate resources. The channel access output may include an indication of a channel access failure. For example, the UE 605 may use the selected one or more candidate resources to attempt to access a corresponding channel. If the UE 605 fails to access the channel, the UE 605 may adjust the adaptive ECW and select an additional set of candidate resources that are within the adjusted adaptive ECW. The indication of the channel access failure may include a failure to receive an acknowledgement (ACK) feedback message associated with an ACK-based PSSCH transmission, a failure of an LBT procedure associated with a slot boundary, a failure to achieve a specified channel occupancy time at a specified sidelink slot, and/or the like.

The at least one parameter of the adaptive ECW that is adjusted may include an anchor time, an adaptive ECW offset associated with the anchor time, an adaptive ECW width, and/or the like. The adaptive ECW offset may include a number of symbols between the anchor time and an initial symbol corresponding to the adaptive ECW. The adaptive ECW width may include a number of symbols.

As shown by reference number 625 and as indicated above, the UE 605 may adjust the adaptive ECW offset, s, associated with an anchor time. The UE 605 may adjust the adaptive ECW offsets linearly (e.g., by adding an adjustment factor to the adaptive ECW offset, by adjusting the adaptive ECW offset using a linear equation, and/or the like), multiplicatively (e.g., by multiplying the adaptive ECW offset by an adjustment factor, by adjusting the adaptive ECW offset using a non-linear equation, and/or the like), and/or the like. The UE 605 may establish a fixed adaptive ECW width, w, and adjust a dynamic adaptive ECW offset s. The channel access output may include an indication of a channel access failure, and the UE 605 may increase the adaptive ECW offset s based at least in part on the indication of the channel access failure. The channel access output may include an indication of a channel access success, and the UE 605 may decrease the adaptive ECW offset based at least in part on the indication of the channel access success.

The UE 605 may introduce randomness in addition to the randomness introduce by random selection from the set of candidate resources. For example, the UE 605 may set an upper distribution bound based at least in part on the channel access output. The upper distribution bound may be determined based on an initial adaptive ECW offset value of the adaptive ECW offset s. The UE 605 may set the upper distribution bound to equal the initial adaptive ECW offset value of the adaptive ECW offset s. The UE 605 may select a random number, S, from a uniform distribution between zero and the upper distribution bound and adjust, based at least in part on the random number, the adaptive ECW offset to determine an adjusted adaptive ECW offset value. For example, the UE 605 may shift the beginning of the ECW, the middle of the ECW, the end of the ECW, or the like, to align with the selected random number S.

As shown by reference number 630 and as indicated above, the UE 605 may adjust the adaptive ECW width w. The UE 605 may adjust the offsets linearly, multiplicatively, and/or the like. The UE 605 may establish a fixed adaptive ECW offsets and adjust the adaptive ECW width w. The channel access output may include an indication of a channel access failure, and the UE 605 may increase the adaptive ECW width w, based at least in part on the indication of the channel access failure. The channel access output may include an indication of a channel access success, and the UE 605 may decrease the adaptive ECW width w, based at least in part on the indication of the channel access success.

In some aspects, the UE 605 may adjust the adaptive ECW offset s and the adaptive ECW width w. The channel access output may include an indication of a channel access failure, and the UE 605 may increase, based at least in part on the indication of the channel access failure, the adaptive ECW offset s and the adaptive ECW width w. The channel access output may include an indication of a channel access success, and the UE 605 may decrease, based at least in part on the indication of the channel access success, the adaptive ECW offset s and the adaptive ECW width w.

As indicated above, the at least one parameter of the adaptive ECW may include an anchor time. The anchor time may be defined by the MAC layer of the UE to include a first slot index of a resource selection window associated with the set of candidate resources, a slot index corresponding to a first available resource within the RSW, a slot index corresponding to a projected LBT completion time associated with the MAC PDU, a maximum slot index of any combination thereof, and/or the like.

The UE 605 may determine the projected LBT completion time based at least in part on a channel access priority class (CAPC) of the MAC PDU. The UE 605 may request, from a physical layer and using the MAC layer, a contention window size corresponding to the CAPC of the MAC PDU. The UE 605 may determine the projected LBT completion time using the MAC layer and based at least in part on the contention window size. The UE 605 may request, from the physical layer and using the MAC layer, an LBT counter value corresponding to the CAPC of the MAC PDU. The UE 605 may determine the projected LBT completion time using the MAC layer and based at least in part on the LBT counter value.

The UE 605 may adjust the at least one parameter using a binary exponential back-off (BEB) algorithm to determine an adjusted value of the at least one parameter. The UE 605 may use the BEB algorithm by determining a minimum parameter value of the at least one parameter and a maximum parameter value of the at least one parameter. The UE 605 may set the at least one parameter to the minimum parameter value. The UE 605 may set, for an iteration, the at least one parameter to a minimum of the maximum parameter value and two times a value of the at least one parameter corresponding to a preceding iteration, based at least in part on the channel access output comprising an indication of a channel access failure. Otherwise, the UE 605 may set the at least one parameter to a minimum parameter value based at least in part on the channel access output comprising an indication of a channel access success.

The UE 605 may adjust the at least one parameter by setting the at least one parameter to the maximum parameter value for a number of iterations. The UE 605 may determine that the number of iterations satisfies an iteration threshold, and set the at least one parameter to the minimum parameter value based at least in part on determining that the number of iterations satisfies the iteration threshold.

The UE 605 may adjust the at least one parameter by determining a minimum parameter value of the at least one parameter and a maximum parameter value of the at least one parameter and determining an increase step size and a decrease step size. The UE 605 may set, for an iteration, the at least one parameter to a minimum of the maximum parameter value and a sum of a value of the at least one parameter corresponding to a preceding iteration and the increase step size, based at least in part on the channel access output comprising an indication of a channel access failure. The UE 605 may set the at least one parameter to a maximum of the minimum parameter value and a difference of a value of the at least one parameter corresponding to the preceding iteration and the decrease step size, based at least in part on the channel access output comprising an indication of a channel access success. The increase step size and/or the decrease step size may correspond to a collision rate based at least in part on a block error rate determined in a channel quality information outer-loop rate control procedure.

The UE 605 may adjust the at least one parameter based at least in part on determining that an LBT CW parameter comprises a maximum LBT CW value. The UE 605 may adjust the at least one parameter by increasing a value of the at least one parameter and setting an LBT contention window (CW) value to a minimum LBT CW value based at least in part on increasing the value of the at least one parameter. The UE 605 may determine that the channel access output includes an indication of a channel access failure, and determine that a slot comprises one or more sidelink control information (SCI) transmissions having a signal strength that satisfies a signal strength threshold. The UE 605 may increase a value of the at least one parameter corresponding to the slot based at least in part on determining that the slot comprises the one or more SCI transmissions having a signal strength that satisfies a signal strength threshold. The UE 605 may determine that a size of an LBT CW is greater than a size of the slot, and increase the value of the at least one parameter corresponding to the slot based at least in part on determining that the size of the LBT CW is greater than the size of the slot.

In some aspects, the UE 605 may transmit and re-transmit HARQ transmissions and may adjust an adaptive ECW parameter based at least in part on a channel access output associated with requesting resources for transmitting the HARQ transmission. The UE 605 may select one or more resources for one or more HARQ transmissions based at least in part on the adaptive ECW. The UE 605 may select the one or more resources for the one or more HARQ transmissions by selecting a first resource for an initial HARQ transmission from the set of candidate resources that are within the adaptive ECW, and determining an anchor time associated with a HARQ retransmission of the initial HARQ transmission based at least in part on a slot index corresponding to the initial resource and a projected LBT completion interval. The UE 605 may determine a repositioned adaptive ECW with respect to the anchor time associated with the initial HARQ transmission. The UE 605 may select a second resource for the HARQ retransmission from an additional set of candidate resources that are within the repositioned adaptive ECW.

The UE 605 may determine the repositioned adaptive ECW based at least in part on at least one PDB. The at least one PDB may include a first PDB associated with the initial HARQ transmission, where the first PDB has a first PDB value, and a second PDB associated with the HARQ retransmission, where the second PDB has a second PDB value that is lower than the first PDB value.

The UE 605 may adjust the at least one parameter of the adaptive ECW based at least in part on a CBR. The UE 605 may receive a configuration that indicates a mapping associated with the CBR. The UE 605 may adjust the at least one parameter of the adaptive ECW based at least in part on the mapping. The configuration may be carried in a system information block (SIB) or a radio resource control (RRC) message. The mapping may include a mapping from the CBR to an activation or deactivation of the adaptive ECW, a mapping from the CBR to the at least one parameter of the adaptive ECW, a mapping from the CBR to a minimum parameter value of the at least one parameter of the adaptive ECW, a mapping from the CBR to a maximum parameter value of the at least one parameter of the adaptive ECW, a binary exponential back-off associated with the at least one parameter of the adaptive ECW, or a collision rate associated with the at least one parameter of the adaptive ECW.

The UE 605 may determine that a first traffic priority of a plurality of traffic priorities corresponds to the MAC PDU. The UE 605 may select the one or more candidate resources of the set of candidate resources that are within the adaptive ECW based at least in part on determining that the first traffic priority of the plurality of traffic priorities corresponds to the MAC PDU. The adaptive ECW may be associated with the first traffic priority, and an additional adaptive ECW may be associated with a second traffic priority of the plurality of traffic priorities. The adaptive ECW may be associated with a first bandwidth of a plurality of bandwidths corresponding to the set of candidate resources. An additional adaptive ECW may be associated with a second bandwidth of the plurality of bandwidths.

The UE 605 may send, using a MAC layer of the UE, a sidelink sensing request to a physical layer of the UE, where the sidelink sensing request indicates, based at least in part on the adaptive ECW, an RSW. The sidelink sensing request indicates a first time period and a second time period, where the first time period comprises an offset between a resource selection trigger and the RSW, and the second time period comprises a width of the RSW. The second time period may include an extra packet data budget associated with the MAC PDU. The sidelink sensing request may indicate the RSW based at least in part on an additional adaptive ECW. In some aspects, the UE 605 may adjust, according to an adaptive ECW, an RSW and/or a sensing window. For example, the UE 605 may enlarge a sensing window, based at least in part on the adaptive ECW, to avoid a resource collision such as a time domain resource collision and/or a frequency domain resource collision.

The adaptive ECW may be associated with an initial HARQ transmission, and the additional adaptive ECW may be associated with a retransmission of the initial HARQ transmission. The sidelink sensing request indicates an additional RSW based at least in part on an additional adaptive ECW. The adaptive ECW is associated with an initial hybrid automatic repeat request (HARQ) transmission, and the additional adaptive ECW may be associated with a retransmission of the initial HARQ transmission. The adaptive ECW may be associated with an initial HARQ transmission. The UE 605 may, using the MAC layer of the UE, send an additional sidelink sensing request to the physical layer of the UE. The additional sidelink sensing request may indicate, based at least in part on an additional adaptive ECW, an additional RSW. The additional adaptive ECW may be associated with a retransmission of the initial HARQ transmission.

As show by reference number 635, the UE 605 may transmit a MAC PDU using the one or more candidate resources or an additional one or more candidate resources. The additional one or more candidate resources may be selected based at least in part on the adjusted at least one parameter.

As indicated above, FIG. 6 is provided as an example. Other examples may differ from what is described with respect to FIG. 6.

FIG. 7 is a diagram illustrating an example 700 associated with ECWs for NR sidelink over unlicensed bands, in accordance with the present disclosure. The example 700 shows a plurality of identified resources that have been determined by a physical layer of a UE (e.g., the UE 605 shown in FIG. 6, the UE 120 shown in FIG. 1, and/or the like).

As shown, the UE (e.g., a MAC layer of the UE) may apply an adaptive ECW to the plurality of identified resources within an RSW to determine a set of candidate resources that are within the adaptive ECW. The adaptive ECW may be defined by an adaptive ECW offset, s (shown as s=1) and an adaptive ECW width, w, of orthogonal frequency division multiplexing (OFDM) symbols (shown as w=2). The UE (e.g., the MAC layer of the UE) may randomly select one or more resources from the set of candidate resources that are within the adaptive ECW. In the illustrated example, the UE 605 may select from among the resources indexed as {2, 3, 4}.

As shown by reference number 710, the UE (e.g., using the MAC layer) may select the one or more candidate resources from among an effective available resource set. The effective available resource set may include a subset of the plurality of identified resources within a resource selection window. As shown, the UE (e.g., using the MAC layer) may determine the effective available resource set by excluding one or more slots of the plurality of identified resources that do not include one or more available resources. Thus, in the illustrated example, the UE may exclude the fourth slot, which contains no available resources. As a result, the effective available resource set includes the resources associated with the first, second, third, and fifth slots. The UE may apply the adaptive ECW to this effective available resource set. As a result, additional efficiencies in processing during resource selection may be enabled by aspects of the techniques described herein.

As indicated above, FIG. 7 is provided as an example. Other examples may differ from what is described with respect to FIG. 7.

Figure 8:
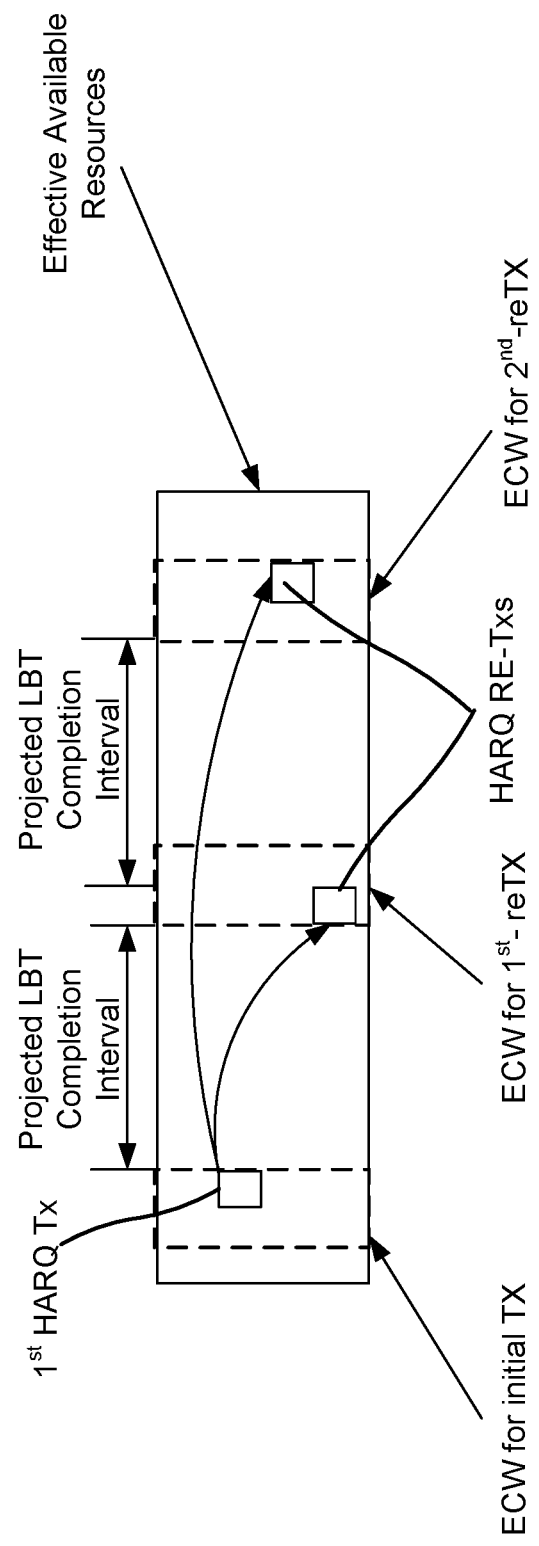

FIG. 8 is a diagram illustrating an example 800 associated with ECWs for NR sidelink over unlicensed bands, in accordance with the present disclosure. The example 800 shows a procedure for resource selection for HARQ transmission and retransmission base at least in part on the adaptive ECW.

As shown, a UE (e.g., the UE 605 shown in FIG. 6, the UE 120 shown in FIG. 1, and/or the like) may select one or more resources for one or more HARQ transmissions based at least in part on the adaptive ECW. The UE may select the one or more resources by selecting a first resource for an initial HARQ transmission from the set of candidate resources that are within the adaptive ECW. The candidate resources may include effective available resources (as shown and as described above in connection with FIG. 7). The UE may determine an anchor time associated with a HARQ retransmission of the initial HARQ transmission based at least in part on a slot index corresponding to the initial resource and a projected LBT completion interval.

The UE may also determine a repositioned adaptive ECW with respect to the anchor time associated with the initial HARQ transmission, as shown, selecting a second resource for the HARQ retransmission from an additional set of candidate resources that are within the repositioned adaptive ECW. The UE may determine the repositioned adaptive ECW based at least in part on at least one PDB. The at least one PDB may include a first PDB associated with the initial HARQ transmission, where the first PDB has a first PDB value, and a second PDB associated with the HARQ retransmission, where the second PDB has a second PDB value that is lower than the first PDB value. The at least one parameter of the adaptive ECW may include at least one first parameter value, and at least one additional parameter of the repositioned adaptive ECW may include at least one second parameter value that is less than the at least one first parameter value.

The UE may adjust the at least one parameter of the adaptive ECW based at least in part on a CBR. The UE may receive (e.g., from a base station, such as base station 110 shown in FIG. 1) a configuration that indicates a mapping associated with the CBR. The configuration may be carried in a SIB, an RRC message, and/or the like. The UE may adjust the at least one parameter of the adaptive ECW based at least in part on the mapping. The mapping may include a mapping from the CBR to an activation or deactivation of the adaptive ECW, a mapping from the CBR to the at least one parameter of the adaptive ECW, a mapping from the CBR to a minimum parameter value of the at least one parameter of the adaptive ECW, a mapping from the CBR to a maximum parameter value of the at least one parameter of the adaptive ECW, a binary exponential back-off associated with the at least one parameter of the adaptive ECW, a collision rate associated with the at least one parameter of the adaptive ECW, and/or the like.

As indicated above, FIG. 8 is provided as an example. Other examples may differ from what is described with respect to FIG. 8.

Figure 9:
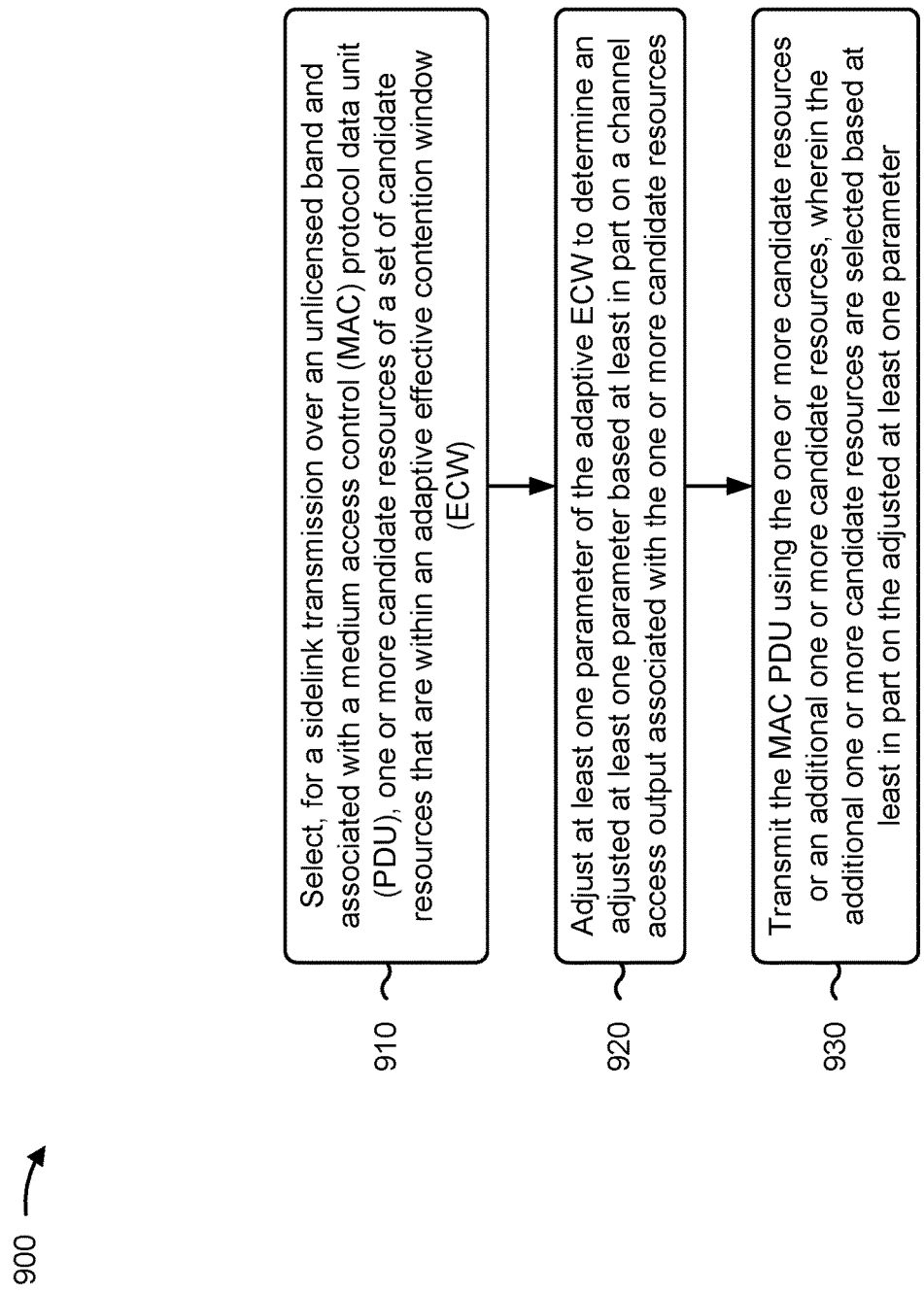
FIG. 9 is a diagram illustrating an example process associated with ECWs for NR sidelink over unlicensed bands, in accordance with the present disclosure.

FIG. 9 is a diagram illustrating an example process 900 performed, for example, by a UE, in accordance with the present disclosure. Example process 900 is an example where the UE (e.g., UE 120) performs operations associated with ECWs for NR sidelink over unlicensed bands.

As shown in FIG. 9, in some aspects, process 900 may include selecting, for a sidelink transmission over an unlicensed band and associated with a MAC PDU, one or more candidate resources of a set of candidate resources that are within an adaptive ECW (block 910). For example, the UE (e.g., using communication manager 1008, depicted in FIG. 10) may select, for a sidelink transmission over an unlicensed band and associated with a MAC PDU, one or more candidate resources of a set of candidate resources that are within an adaptive ECW, as described above.

As further shown in FIG. 9, in some aspects, process 900 may include adjusting at least one parameter of the adaptive ECW to determine an adjusted at least one parameter based at least in part on a channel access output associated with the one or more candidate resources (block 920). For example, the UE (e.g., using communication manager 1008, depicted in FIG. 10) may adjust at least one parameter of the adaptive ECW to determine an adjusted at least one parameter based at least in part on a channel access output associated with the one or more candidate resources, as described above.

As further shown in FIG. 9, in some aspects, process 900 may include transmitting the MAC PDU using the one or more candidate resources or an additional one or more candidate resources, wherein the additional one or more candidate resources are selected based at least in part on the adjusted at least one parameter (block 930). For example, the UE (e.g., using transmission component 1004, depicted in FIG. 10) may transmit the MAC PDU using the one or more candidate resources or an additional one or more candidate resources, wherein the additional one or more candidate resources are selected based at least in part on the adjusted at least one parameter, as described above.

Process 900 may include additional aspects, such as any single aspect or any combination of aspects described below and/or in connection with one or more other processes described elsewhere herein.

In a first aspect, selecting the one or more candidate resources comprises selecting the one or more candidate resources randomly.

In a second aspect, alone or in combination with the first aspect, the at least one parameter of the adaptive ECW comprises at least one of an anchor time, an adaptive ECW offset associated with the anchor time, or an adaptive ECW width.

In a third aspect, alone or in combination with one or more of the first and second aspects, the adaptive ECW offset comprises a number of symbols between the anchor time and an initial symbol corresponding to the adaptive ECW.

In a fourth aspect, alone or in combination with one or more of the first through third aspects, the adaptive ECW width comprises a number of symbols.

In a fifth aspect, alone or in combination with one or more of the first through fourth aspects, the channel access output comprises an indication of a channel access failure, and adjusting the at least one parameter comprises increasing the adaptive ECW width based at least in part on the indication of the channel access failure.

In a sixth aspect, alone or in combination with one or more of the first through fifth aspects, increasing the adaptive ECW width comprises increasing the adaptive ECW width multiplicatively.

In a seventh aspect, alone or in combination with one or more of the first through fourth aspects, the channel access output comprises an indication of a channel access success, and adjusting the at least one parameter comprises decreasing the adaptive ECW width based at least in part on the indication of the channel access success.

In an eighth aspect, alone or in combination with one or more of the first through seventh aspects, decreasing the adaptive ECW width comprises decreasing the adaptive ECW width linearly.

In a ninth aspect, alone or in combination with one or more of the first through fourth aspects, the channel access output comprises an indication of a channel access failure, and adjusting the at least one parameter comprises increasing the adaptive ECW offset based at least in part on the indication of the channel access failure.

In a tenth aspect, alone or in combination with one or more of the first through fourth aspects, the channel access output comprises an indication of a channel access success, and adjusting the at least one parameter comprises decreasing the adaptive ECW offset based at least in part on the indication of the channel access success.

In an eleventh aspect, alone or in combination with one or more of the first through tenth aspects, adjusting the at least one parameter comprises setting an upper distribution bound based at least in part on the channel access output, wherein the upper distribution bound is determined based on an initial adaptive ECW offset value of the adaptive ECW offset, selecting a random number from a uniform distribution between zero and the upper distribution bound, and adjusting, based at least in part on the random number, the adaptive ECW offset to determine an adjusted adaptive ECW offset value.

In a twelfth aspect, alone or in combination with one or more of the first through eleventh aspects, the adjusted adaptive ECW offset value corresponds to a number of symbols offset from the anchor time, wherein the number of symbols comprises the random number.

In a thirteenth aspect, alone or in combination with one or more of the first through fourth aspects, the channel access output comprises an indication of a channel access failure, and adjusting the at least one parameter comprises increasing, based at least in part on the indication of the channel access failure, the adaptive ECW width and the adaptive ECW offset.

In a fourteenth aspect, alone or in combination with one or more of the first through fourth aspects, the channel access output comprises an indication of a channel access success, and adjusting the at least one parameter comprises decreasing, based at least in part on the indication of the channel access success, the adaptive ECW width and the adaptive ECW offset.

In a fifteenth aspect, alone or in combination with one or more of the first through fourteenth aspects, the channel access output comprises an indication of a channel access failure, and the indication of the channel access failure comprises at least one of a failure to receive an ACK feedback message associated with an ACK-based physical sidelink shared channel transmission, a failure of an LBT procedure associated with a slot boundary, or a failure to achieve a specified channel occupancy time at a specified sidelink slot.

In a sixteenth aspect, alone or in combination with one or more of the first through fifteenth aspects, process 900 includes determining the set of candidate resources based at least in part on a sensing operation performed by a physical layer of the UE.

In a seventeenth aspect, alone or in combination with one or more of the first through sixteenth aspects, the set of candidate resources comprises an effective available resource set, wherein the effective available resource set comprises a subset of a plurality of identified resources within a resource selection window.

In an eighteenth aspect, alone or in combination with one or more of the first through seventeenth aspects, process 900 includes determining the effective available resource set by excluding one or more slots of the plurality of identified resources that do not include one or more available resources.

In a nineteenth aspect, alone or in combination with one or more of the first through eighteenth aspects, the at least one parameter of the adaptive ECW comprises an anchor time, and process 900 further comprises defining, using a MAC layer, the anchor time to include a first slot index of a resource selection window associated with the set of candidate resources, a slot index corresponding to a first available resource within the resource selection window, a slot index corresponding to a projected LBT completion time associated with the MAC PDU, or a maximum slot index of any combination thereof.

In a twentieth aspect, alone or in combination with one or more of the first through nineteenth aspects, process 900 includes determining the projected LBT completion time based at least in part on a CAPC of the MAC PDU.

In a twenty-first aspect, alone or in combination with one or more of the first through twentieth aspects, process 900 includes requesting, from a physical layer and using the MAC layer, a contention window size corresponding to the CAPC of the MAC PDU, wherein determining the projected LBT completion time comprises determining the projected LBT completion time using the MAC layer and based at least in part on the contention window size.

In a twenty-second aspect, alone or in combination with one or more of the first through twenty-first aspects, process 900 includes requesting, from a physical layer and using the MAC layer, an LBT counter value corresponding to the CAPC of the MAC PDU, wherein determining the projected LBT completion time comprises determining the projected LBT completion time using the MAC layer and based at least in part on the LBT counter value.

In a twenty-third aspect, alone or in combination with one or more of the first through twenty-second aspects, adjusting the at least one parameter comprises using a binary exponential back-off algorithm to determine an adjusted value of the at least one parameter.

In a twenty-fourth aspect, alone or in combination with one or more of the first through twenty-third aspects, using the binary exponential back-off algorithm comprises determining a minimum parameter value of the at least one parameter and a maximum parameter value of the at least one parameter, setting the at least one parameter to the minimum parameter value, and setting, for an iteration, the at least one parameter to a minimum of the maximum parameter value and two times a value of the at least one parameter corresponding to a preceding iteration, based at least in part on the channel access output comprising an indication of a channel access failure, or the minimum parameter value based at least in part on the channel access output comprising an indication of a channel access success.

In a twenty-fifth aspect, alone or in combination with one or more of the first through twenty-fourth aspects, adjusting the at least one parameter comprises setting the at least one parameter to the maximum parameter value for a number of iterations, determining that the number of iterations satisfies an iteration threshold, and setting the at least one parameter to the minimum parameter value based at least in part on determining that the number of iterations satisfies the iteration threshold.

In a twenty-sixth aspect, alone or in combination with one or more of the first through twenty-fifth aspects, adjusting the at least one parameter comprises determining a minimum parameter value of the at least one parameter and a maximum parameter value of the at least one parameter, determining an increase step size and a decrease step size, and setting, for an iteration, the at least one parameter to a minimum of the maximum parameter value and a sum of a value of the at least one parameter corresponding to a preceding iteration and the increase step size, based at least in part on the channel access output comprising an indication of a channel access failure, or a maximum of the minimum parameter value and a difference of a value of the at least one parameter corresponding to the preceding iteration and the decrease step size, based at least in part on the channel access output comprising an indication of a channel access success.

In a twenty-seventh aspect, alone or in combination with one or more of the first through twenty-sixth aspects, at least one of the increase step size or the decrease step size corresponds to a collision rate based at least in part on a block error rate determined in a channel quality information outer-loop rate control procedure.

Ina twenty-eighth aspect, alone or in combination with one or more of the first through twenty-seventh aspects, adjusting the at least one parameter comprises adjusting the at least one parameter based at least in part on determining that an LBT CW parameter comprises a maximum LBT CW value.

In a twenty-ninth aspect, alone or in combination with one or more of the first through twenty-eighth aspects, adjusting the at least one parameter comprises increasing a value of the at least one parameter, and process 900 further comprises setting an LBT CW value to a minimum LBT CW value based at least in part on increasing the value of the at least one parameter.

In a thirtieth aspect, alone or in combination with one or more of the first through twenty-ninth aspects, adjusting the at least one parameter comprises determining that the channel access output comprises an indication of a channel access failure, determining that a slot comprises one or more SCI transmissions having a signal strength that satisfies a signal strength threshold, and increasing a value of the at least one parameter corresponding to the slot based at least in part on determining that the slot comprises the one or more SCI transmissions having a signal strength that satisfies a signal strength threshold.

In a thirty-first aspect, alone or in combination with one or more of the first through thirtieth aspects, process 900 includes determining that a size of an LBT CW is greater than a size of the slot, and increasing the value of the at least one parameter corresponding to the slot comprises increasing the value of the at least one parameter corresponding to the slot based at least in part on determining that the size of the LBT CW is greater than the size of the slot.

In a thirty-second aspect, alone or in combination with one or more of the first through thirty-first aspects, process 900 includes selecting one or more resources for one or more HARQ transmissions based at least in part on the adaptive ECW.

In a thirty-third aspect, alone or in combination with one or more of the first through thirty-second aspects, selecting the one or more resources for the one or more HARQ transmissions comprises selecting a first resource for an initial HARQ transmission from the set of candidate resources that are within the adaptive ECW, determining an anchor time associated with a HARQ retransmission of the initial HARQ transmission based at least in part on a slot index corresponding to the initial resource and a projected listen-before-talk completion interval, determining a repositioned adaptive ECW with respect to the anchor time associated with the initial HARQ transmission, and selecting a second resource for the HARQ retransmission from an additional set of candidate resources that are within the repositioned adaptive ECW.

In a thirty-fourth aspect, alone or in combination with one or more of the first through thirty-third aspects, determining the repositioned adaptive ECW comprises determining the repositioned adaptive ECW based at least in part on at least one PDB.

In a thirty-fifth aspect, alone or in combination with one or more of the first through thirty-fourth aspects, the at least one PDB comprises a first PDB associated with the initial HARQ transmission, wherein the first PDB has a first PDB value, and a second PDB associated with the HARQ retransmission, wherein the second PDB has a second PDB value that is lower than the first PDB value.

In a thirty-sixth aspect, alone or in combination with one or more of the first through thirty-fifth aspects, the at least one parameter of the adaptive ECW has at least one first parameter value, and at least one additional parameter of the repositioned adaptive ECW has at least one second parameter value that is less than the at least one first parameter value.

In a thirty-seventh aspect, alone or in combination with one or more of the first through thirty-sixth aspects, adjusting the at least one parameter of the adaptive ECW comprises adjusting the at least one parameter of the adaptive ECW based at least in part on a CBR.

In a thirty-eighth aspect, alone or in combination with one or more of the first through thirty-seventh aspects, process 900 includes receiving a configuration that indicates a mapping associated with the CBR, wherein adjusting the at least one parameter of the adaptive ECW comprises adjusting the at least one parameter of the adaptive ECW based at least in part on the mapping.

In a thirty-ninth aspect, alone or in combination with one or more of the first through thirty-eighth aspects, the configuration is carried in at least one of a system information block, or a radio resource control message.

In a fortieth aspect, alone or in combination with one or more of the first through thirty-ninth aspects, the mapping comprises at least one of a mapping from the CBR to an activation or deactivation of the adaptive ECW, a mapping from the CBR to the at least one parameter of the adaptive ECW, a mapping from the CBR to a minimum parameter value of the at least one parameter of the adaptive ECW, a mapping from the CBR to a maximum parameter value of the at least one parameter of the adaptive ECW, a binary exponential back-off associated with the at least one parameter of the adaptive ECW, or a collision rate associated with the at least one parameter of the adaptive ECW.

In a forty-first aspect, alone or in combination with one or more of the first through fortieth aspects, process 900 includes determining that a first traffic priority of a plurality of traffic priorities corresponds to the MAC PDU, wherein selecting the one or more candidate resources of the set of candidate resources that are within the adaptive ECW comprises selecting the one or more candidate resources based at least in part on determining that the first traffic priority of the plurality of traffic priorities corresponds to the MAC PDU, wherein the adaptive ECW is associated with the first traffic priority, and wherein an additional adaptive ECW is associated with a second traffic priority of the plurality of traffic priorities.

In a forty-second aspect, alone or in combination with one or more of the first through forty-first aspects, the adaptive ECW is associated with a first bandwidth of a plurality of bandwidths corresponding to the set of candidate resources, and an additional adaptive ECW is associated with a second bandwidth of the plurality of bandwidths.

In a forty-third aspect, alone or in combination with one or more of the first through forty-second aspects, process 900 includes sending, using a MAC layer of the UE, a sidelink sensing request to a physical layer of the UE, wherein the sidelink sensing request indicates, based at least in part on the adaptive ECW, a resource selection window (RSW).

In a forty-fourth aspect, alone or in combination with one or more of the first through forty-third aspects, the sidelink sensing request indicates a first time period and a second time period, wherein the first time period comprises an offset between a resource selection trigger and the RSW and the second time period comprises a width of the RSW.

In a forty-fifth aspect, alone or in combination with one or more of the first through forty-fourth aspects, the second time period comprises a packet data budget associated with the MAC PDU.

In a forty-sixth aspect, alone or in combination with one or more of the first through forty-fifth aspects, the sidelink sensing request indicates the RSW based at least in part on an additional adaptive ECW, wherein the adaptive ECW is associated with an initial HARQ transmission, and wherein the additional adaptive ECW is associated with a retransmission of the initial HARQ transmission.

In a forty-seventh aspect, alone or in combination with one or more of the first through forty-sixth aspects, the sidelink sensing request indicates an additional RSW based at least in part on an additional adaptive ECW, wherein the adaptive ECW is associated with an initial HARQ transmission, and wherein the additional adaptive ECW is associated with a retransmission of the initial HARQ transmission.

In a forty-eighth aspect, alone or in combination with one or more of the first through forty-seventh aspects, the adaptive ECW is associated with an initial HARQ transmission, and process 900 further comprises sending, using the MAC layer of the UE, an additional sidelink sensing request to the physical layer of the UE, wherein the additional sidelink sensing request indicates, based at least in part on an additional adaptive ECW, an additional RSW, wherein the additional adaptive ECW is associated with a retransmission of the initial HARQ transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
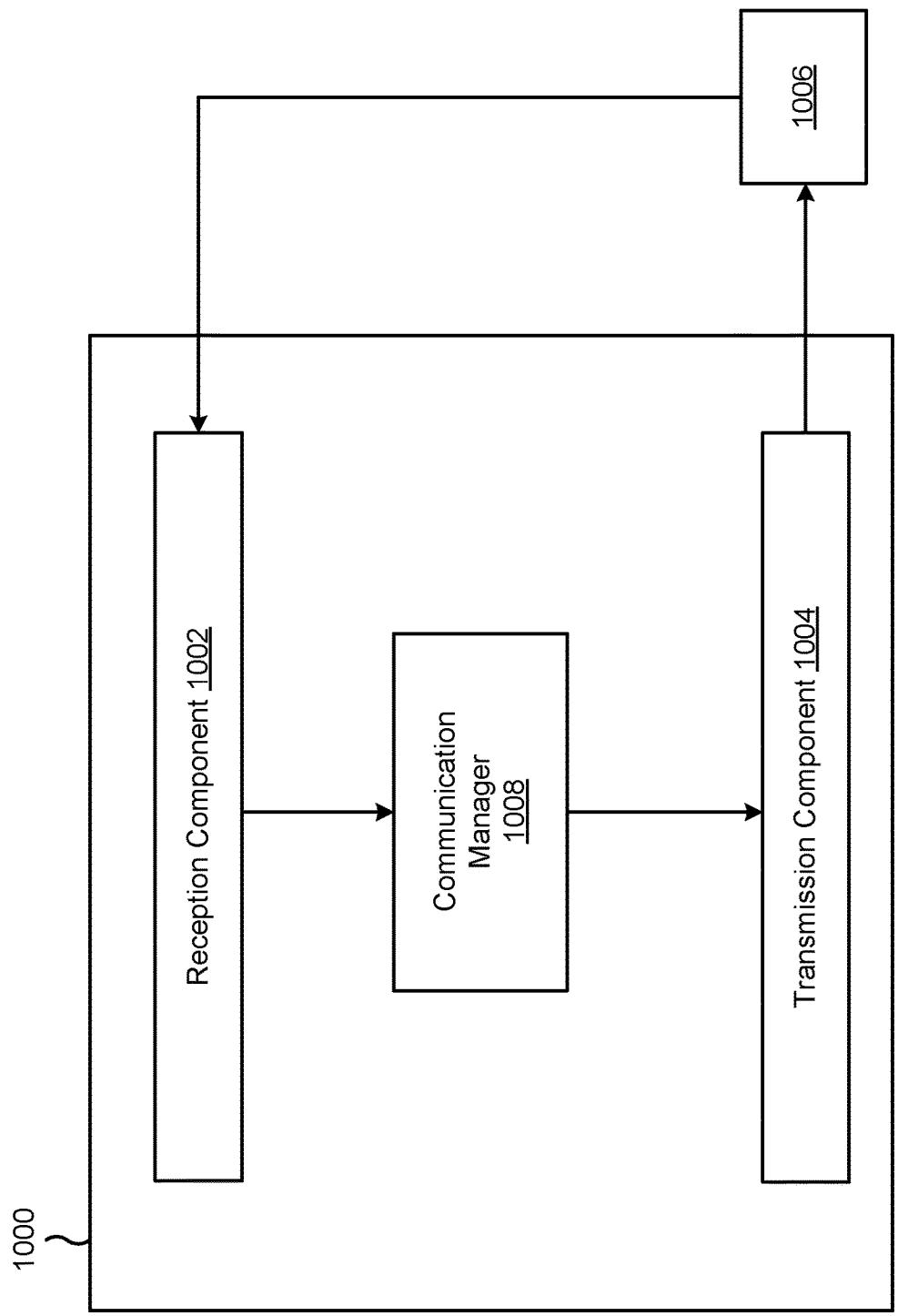
FIG. 10 is a block diagram of an example apparatus for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008, among other examples.

In some aspects, the apparatus 1000 may be configured to perform one or more operations described herein in connection with FIGS. 6-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The communication manager 1008 may select, for a sidelink transmission over an unlicensed band and associated with a MAC PDU, one or more candidate resources of a set of candidate resources that are within an adaptive ECW. The communication manager 1008 may adjust at least one parameter of the adaptive ECW to determine an adjusted at least one parameter based at least in part on a channel access output associated with the one or more candidate resources. In some aspects, the communication manager 1008 may include a demodulator, a MIMO detector, a receive processor, a modulator, a transmit MIMO processor, a transmit processor, a controller/processor, a memory, or a combination thereof, of the UE described above in connection with FIG. 2. The transmission component 1004 may transmit the MAC PDU using the one or more candidate resources or an additional one or more candidate resources, wherein the additional one or more candidate resources are selected based at least in part on the adjusted at least one parameter.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: selecting, for a sidelink transmission over an unlicensed band and associated with a medium access control (MAC) protocol data unit (PDU), one or more candidate resources of a set of candidate resources that are within an adaptive effective contention window (ECW); adjusting at least one parameter of the adaptive ECW to determine an adjusted at least one parameter based at least in part on a channel access output associated with the one or more candidate resources; and transmitting the MAC PDU using the one or more candidate resources or an additional one or more candidate resources, wherein the additional one or more candidate resources are selected based at least in part on the adjusted at least one parameter.

Aspect 2: The method of Aspect 1, wherein selecting the one or more candidate resources comprises selecting the one or more candidate resources randomly.

Aspect 3: The method of either of Aspects 1 or 2, wherein the at least one parameter of the adaptive ECW comprises at least one of: an anchor time, an adaptive ECW offset associated with the anchor time, or an adaptive ECW width.

Aspect 4: The method of Aspect 3, wherein the adaptive ECW offset comprises a number of symbols between the anchor time and an initial symbol corresponding to the adaptive ECW.

Aspect 5: The method of either of Aspects 3 or 4, wherein the adaptive ECW width comprises a number of symbols.

Aspect 6: The method of any of Aspects 3-5, wherein the channel access output comprises an indication of a channel access failure, and wherein adjusting the at least one parameter comprises increasing the adaptive ECW width based at least in part on the indication of the channel access failure.

Aspect 7: The method of Aspect 6, wherein increasing the adaptive ECW width comprises increasing the adaptive ECW width multiplicatively.

Aspect 8: The method of any of Aspects 3-5, wherein the channel access output comprises an indication of a channel access success, and wherein adjusting the at least one parameter comprises decreasing the adaptive ECW width based at least in part on the indication of the channel access success.

Aspect 9: The method of Aspect 8, wherein decreasing the adaptive ECW width comprises decreasing the adaptive ECW width linearly.

Aspect 10: The method of any of Aspects 3-5, wherein the channel access output comprises an indication of a channel access failure, and wherein adjusting the at least one parameter comprises increasing the adaptive ECW offset based at least in part on the indication of the channel access failure.

Aspect 11: The method of any of Aspects 3-5, wherein the channel access output comprises an indication of a channel access success, and wherein adjusting the at least one parameter comprises decreasing the adaptive ECW offset based at least in part on the indication of the channel access success.

Aspect 12: The method of any of Aspects 3-11, wherein adjusting the at least one parameter comprises: setting an upper distribution bound based at least in part on the channel access output, wherein the upper distribution bound is determined based on an initial adaptive ECW offset value of the adaptive ECW offset; selecting a random number from a uniform distribution between zero and the upper distribution bound; and adjusting, based at least in part on the random number, the adaptive ECW offset to determine an adjusted adaptive ECW offset value.

Aspect 13: The method of Aspect 12, wherein the adjusted adaptive ECW offset value corresponds to a number of symbols offset from the anchor time, wherein the number of symbols comprises the random number.

Aspect 14: The method of any of Aspects 3-5, wherein the channel access output comprises an indication of a channel access failure, and wherein adjusting the at least one parameter comprises increasing, based at least in part on the indication of the channel access failure, the adaptive ECW width and the adaptive ECW offset.

Aspect 15: The method of any of Aspects 3-5, wherein the channel access output comprises an indication of a channel access success, and wherein adjusting the at least one parameter comprises decreasing, based at least in part on the indication of the channel access success, the adaptive ECW width and the adaptive ECW offset.

Aspect 16: The method of Aspect 1, wherein the channel access output comprises an indication of a channel access failure, and wherein the indication of the channel access failure comprises at least one of: a failure to receive an acknowledgement (ACK) feedback message associated with an ACK-based physical sidelink shared channel transmission, a failure of a listen-before-talk (LBT) procedure associated with a slot boundary, or a failure to achieve a specified channel occupancy time at a specified sidelink slot.

Aspect 17: The method of any of Aspects 1-16, further comprising determining the set of candidate resources based at least in part on a sensing operation performed by a physical layer of the UE.

Aspect 18: The method of Aspect 17, wherein the set of candidate resources comprises an effective available resource set, wherein the effective available resource set comprises a subset of a plurality of identified resources within a resource selection window.

Aspect 19: The method of Aspect 18, further comprising determining the effective available resource set by excluding one or more slots of the plurality of identified resources that do not include one or more available resources.

Aspect 20: The method of any of Aspects 1-19, wherein the at least one parameter of the adaptive ECW comprises an anchor time, and wherein the method further comprises defining, using a MAC layer, the anchor time to include: a first slot index of a resource selection window associated with the set of candidate resources, a slot index corresponding to a first available resource within the resource selection window, a slot index corresponding to a projected listen-before-talk (LBT) completion time associated with the MAC PDU, or a maximum slot index of any combination thereof.

Aspect 21: The method of Aspect 20, further comprising determining the projected LBT completion time based at least in part on a channel access priority class (CAPC) of the MAC PDU.

Aspect 22: The method of Aspect 21, further comprising requesting, from a physical layer and using the MAC layer, a contention window size corresponding to the CAPC of the MAC PDU, wherein determining the projected LBT completion time comprises determining the projected LBT completion time using the MAC layer and based at least in part on the contention window size.

Aspect 23: The method of either of Aspects 21 or 22, further comprising requesting, from a physical layer and using the MAC layer, an LBT counter value corresponding to the CAPC of the MAC PDU, wherein determining the projected LBT completion time comprises determining the projected LBT completion time using the MAC layer and based at least in part on the LBT counter value.

Aspect 24: The method of any of Aspects 1-23, wherein adjusting the at least one parameter comprises using a binary exponential back-off algorithm to determine an adjusted value of the at least one parameter.

Aspect 25: The method of Aspect 24, wherein using the binary exponential back-off algorithm comprises: determining a minimum parameter value of the at least one parameter and a maximum parameter value of the at least one parameter; setting the at least one parameter to the minimum parameter value; and setting, for an iteration, the at least one parameter to: a minimum of the maximum parameter value and two times a value of the at least one parameter corresponding to a preceding iteration, based at least in part on the channel access output comprising an indication of a channel access failure; or the minimum parameter value based at least in part on the channel access output comprising an indication of a channel access success.

Aspect 26: The method of Aspect 25, wherein adjusting the at least one parameter comprises: setting the at least one parameter to the maximum parameter value for a number of iterations; determining that the number of iterations satisfies an iteration threshold; and setting the at least one parameter to the minimum parameter value based at least in part on determining that the number of iterations satisfies the iteration threshold.

Aspect 27: The method of any of Aspects 1-26, wherein adjusting the at least one parameter comprises: determining a minimum parameter value of the at least one parameter and a maximum parameter value of the at least one parameter; determining an increase step size and a decrease step size; and setting, for an iteration, the at least one parameter to: a minimum of the maximum parameter value and a sum of a value of the at least one parameter corresponding to a preceding iteration and the increase step size, based at least in part on the channel access output comprising an indication of a channel access failure; or a maximum of the minimum parameter value and a difference of a value of the at least one parameter corresponding to the preceding iteration and the decrease step size, based at least in part on the channel access output comprising an indication of a channel access success.

Aspect 28: The method of Aspect 27, wherein at least one of the increase step size or the decrease step size corresponds to a collision rate based at least in part on a block error rate determined in a channel quality information outer-loop rate control procedure.

Aspect 29: The method of any of Aspects 1-28, wherein adjusting the at least one parameter comprises adjusting the at least one parameter based at least in part on determining that a listen-before-talk (LBT) contention window (CW) parameter comprises a maximum LBT CW value.

Aspect 30: The method of any of Aspects 1-29, wherein adjusting the at least one parameter comprises increasing a value of the at least one parameter; and wherein the method further comprises setting a listen-before-talk (LBT) contention window (CW) value to a minimum LBT CW value based at least in part on increasing the value of the at least one parameter.

Aspect 31: The method of any of Aspects 1-30, wherein adjusting the at least one parameter comprises: determining that the channel access output comprises an indication of a channel access failure; determining that a slot comprises one or more sidelink control information (SCI) transmissions having a signal strength that satisfies a signal strength threshold; and increasing a value of the at least one parameter corresponding to the slot based at least in part on determining that the slot comprises the one or more SCI transmissions having a signal strength that satisfies a signal strength threshold.

Aspect 32: The method of Aspect 31, further comprising: determining that a size of a listen-before-talk (LBT) contention window (CW) is greater than a size of the slot, and wherein increasing the value of the at least one parameter corresponding to the slot comprises increasing the value of the at least one parameter corresponding to the slot based at least in part on determining that the size of the LBT CW is greater than the size of the slot. Wherein increasing the value of the at least one parameter corresponding to the slot comprises increasing the value of the at least one parameter corresponding to the slot based at least in part on determining that the size of the LBT CW is greater than the size of the slot.

Aspect 33: The method of any of Aspects 1-32, further comprising selecting one or more resources for one or more hybrid automatic repeat request (HARQ) transmissions based at least in part on the adaptive ECW.

Aspect 34: The method of Aspect 33, wherein selecting the one or more resources for the one or more HARQ transmissions comprises: selecting a first resource for an initial HARQ transmission from the set of candidate resources that are within the adaptive ECW; determining an anchor time associated with a HARQ retransmission of the initial HARQ transmission based at least in part on a slot index corresponding to the initial resource and a projected listen-before-talk completion interval; determining a repositioned adaptive ECW with respect to the anchor time associated with the initial HARQ transmission; and selecting a second resource for the HARQ retransmission from an additional set of candidate resources that are within the repositioned adaptive ECW.

Aspect 35: The method of Aspect 34, wherein determining the repositioned adaptive ECW comprises determining the repositioned adaptive ECW based at least in part on at least one packet delay budget (PDB).

Aspect 36: The method of Aspect 35, wherein the at least one PDB comprises: a first PDB associated with the initial HARQ transmission, wherein the first PDB has a first PDB value; and a second PDB associated with the HARQ retransmission, wherein the second PDB has a second PDB value that is lower than the first PDB value.

Aspect 37: The method of Aspect 36, wherein the at least one parameter of the adaptive ECW has at least one first parameter value, and wherein at least one additional parameter of the repositioned adaptive ECW has at least one second parameter value that is less than the at least one first parameter value.

Aspect 38: The method of any of Aspects 1-37, wherein adjusting the at least one parameter of the adaptive ECW comprises adjusting the at least one parameter of the adaptive ECW based at least in part on a channel busy ratio (CBR).

Aspect 39: The method of Aspect 38, further comprising receiving a configuration that indicates a mapping associated with the CBR, wherein adjusting the at least one parameter of the adaptive ECW comprises adjusting the at least one parameter of the adaptive ECW based at least in part on the mapping.

Aspect 40: The method of Aspect 39, wherein the configuration is carried in at least one of: a system information block, or a radio resource control message.

Aspect 41: The method of either of Aspects 39 or 40, wherein the mapping comprises at least one of: a mapping from the CBR to an activation or deactivation of the adaptive ECW, a mapping from the CBR to the at least one parameter of the adaptive ECW, a mapping from the CBR to a minimum parameter value of the at least one parameter of the adaptive ECW, a mapping from the CBR to a maximum parameter value of the at least one parameter of the adaptive ECW, a binary exponential back-off associated with the at least one parameter of the adaptive ECW, or a collision rate associated with the at least one parameter of the adaptive ECW.

Aspect 42: The method of any of Aspects 1-41, further comprising: determining that a first traffic priority of a plurality of traffic priorities corresponds to the MAC PDU, wherein selecting the one or more candidate resources of the set of candidate resources that are within the adaptive ECW comprises selecting the one or more candidate resources based at least in part on determining that the first traffic priority of the plurality of traffic priorities corresponds to the MAC PDU, wherein the adaptive ECW is associated with the first traffic priority, and wherein an additional adaptive ECW is associated with a second traffic priority of the plurality of traffic priorities.

Aspect 43: The method of any of Aspects 1-42, wherein the adaptive ECW is associated with a first bandwidth of a plurality of bandwidths corresponding to the set of candidate resources, and wherein an additional adaptive ECW is associated with a second bandwidth of the plurality of bandwidths.

Aspect 44: The method of any of Aspects 1-43, further comprising sending, using a MAC layer of the UE, a sidelink sensing request to a physical layer of the UE, wherein the sidelink sensing request indicates, based at least in part on the adaptive ECW, at least one of a resource selection window (RSW) or a sensing window.

Aspect 45: The method of Aspect 44, wherein the sidelink sensing request indicates a first time period and a second time period, wherein the first time period comprises an offset between a resource selection trigger and the RSW, and wherein the second time period comprises a width of the RSW.

Aspect 46: The method of Aspect 45, wherein the second time period comprises a packet data budget associated with the MAC PDU.

Aspect 47: The method of any of Aspects 44-46, wherein the sidelink sensing request indicates the RSW based at least in part on an additional adaptive ECW, wherein the adaptive ECW is associated with an initial hybrid automatic repeat request (HARQ) transmission, and wherein the additional adaptive ECW is associated with a retransmission of the initial HARQ transmission.

Aspect 48: The method of any of Aspects 44-47, wherein the sidelink sensing request indicates an additional RSW based at least in part on an additional adaptive ECW, wherein the adaptive ECW is associated with an initial hybrid automatic repeat request (HARQ) transmission, and wherein the additional adaptive ECW is associated with a retransmission of the initial HARQ transmission.

Aspect 49: The method of any of Aspects 44-48, wherein the adaptive ECW is associated with an initial hybrid automatic repeat request (HARQ) transmission, and wherein the method further comprises sending, using the MAC layer of the UE, an additional sidelink sensing request to the physical layer of the UE, wherein the additional sidelink sensing request indicates, based at least in part on an additional adaptive ECW, an additional RSW, wherein the additional adaptive ECW is associated with a retransmission of the initial HARQ transmission.

Aspect 50: An apparatus for wireless communication at a device, comprising a processor; memory coupled with the processor; and instructions stored in the memory and executable by the processor to cause the apparatus to perform the method of one or more of Aspects 1-49.

Aspect 51: A device for wireless communication, comprising a memory and one or more processors coupled to the memory, the one or more processors configured to perform the method of one or more of Aspects 1-49.

Aspect 52: An apparatus for wireless communication, comprising at least one means for performing the method of one or more of Aspects 1-49.

Aspect 53: A non-transitory computer-readable medium storing code for wireless communication, the code comprising instructions executable by a processor to perform the method of one or more of Aspects 1-49.

Aspect 54: A non-transitory computer-readable medium storing a set of instructions for wireless communication, the set of instructions comprising one or more instructions that, when executed by one or more processors of a device, cause the device to perform the method of one or more of Aspects 1-49.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        select, for a sidelink transmission over an unlicensed band and associated with a medium access control (MAC) protocol data unit (PDU), one or more candidate resources of a set of candidate resources that are within an adaptive effective contention window (ECW);
        adjust at least one parameter of the adaptive ECW to determine an adjusted at least one parameter based at least in part on a channel access output associated with the one or more candidate resources; and
        transmit the MAC PDU using the one or more candidate resources or an additional one or more candidate resources, wherein the additional one or more candidate resources are selected based at least in part on the adjusted at least one parameter.

2. The UE of claim 1, wherein the one or more processors, to select the one or more candidate resources, are configured to select the one or more candidate resources randomly.

3. The UE of claim 1, wherein the at least one parameter of the adaptive ECW comprises at least one of:
    an anchor time,
    an adaptive ECW offset associated with the anchor time, or
    an adaptive ECW width.

4. The UE of claim 3, wherein the adaptive ECW offset comprises a number of symbols between the anchor time and an initial symbol corresponding to the adaptive ECW.

5. The UE of claim 3, wherein the adaptive ECW width comprises a number of symbols.

6. The UE of claim 3, wherein the channel access output comprises an indication of a channel access failure, and
wherein the one or more processors, to adjust the at least one parameter, are configured to increase the adaptive ECW width based at least in part on the indication of the channel access failure.

7. The UE of claim 6, wherein the one or more processors, to increase the adaptive ECW width, are configured to increase the adaptive ECW width multiplicatively.

8. The UE of claim 3, wherein the channel access output comprises an indication of a channel access success, and
wherein the one or more processors, to adjust the at least one parameter, are configured to decrease the adaptive ECW width based at least in part on the indication of the channel access success.

9. The UE of claim 8, wherein the one or more processors, to decrease the adaptive ECW width, are configured to decrease the adaptive ECW width linearly.

10. The UE of claim 3, wherein the channel access output comprises an indication of a channel access failure, and
wherein the one or more processors, to adjust the at least one parameter, are configured to increase the adaptive ECW offset based at least in part on the indication of the channel access failure.

11. The UE of claim 3, wherein the channel access output comprises an indication of a channel access success, and
wherein the one or more processors, to adjust the at least one parameter, are configured to decrease the adaptive ECW offset based at least in part on the indication of the channel access success.

12. The UE of claim 3, wherein the one or more processors, to adjust the at least one parameter, are configured to:
set an upper distribution bound based at least in part on the channel access output, wherein the upper distribution bound is determined based on an initial adaptive ECW offset value of the adaptive ECW offset;
select a random number from a uniform distribution between zero and the upper distribution bound; and
adjust, based at least in part on the random number, the adaptive ECW offset to determine an adjusted adaptive ECW offset value.

13. The UE of claim 12, wherein the adjusted adaptive ECW offset value corresponds to a number of symbols offset from the anchor time, wherein the number of symbols comprises the random number.

14. The UE of claim 3, wherein the channel access output comprises an indication of a channel access failure, and
wherein the one or more processors, to adjust the at least one parameter, are configured to increase, based at least in part on the indication of the channel access failure, the adaptive ECW width and the adaptive ECW offset.

15. The UE of claim 3, wherein the channel access output comprises an indication of a channel access success, and
wherein the one or more processors, to adjust the at least one parameter, are configured to decrease, based at least in part on the indication of the channel access success, the adaptive ECW width and the adaptive ECW offset.

16. The UE of claim 3, wherein the channel access output includes an indication of a channel access failure or an indication of a channel access success.

17. The UE of claim 1, wherein the channel access output comprises an indication of a channel access failure, and wherein the indication of the channel access failure comprises at least one of:

a failure to receive an acknowledgement (ACK) feedback message associated with an ACK-based physical sidelink shared channel transmission,
a failure of a listen-before-talk (LBT) procedure associated with a slot boundary, or
a failure to achieve a specified channel occupancy time at a specified sidelink slot.

18. The UE of claim 1, wherein the one or more processors, to adjust the at least one parameter, are configured to adjust the at least one parameter based at least in part on determining that a listen-before-talk (LBT) contention window (CW) parameter comprises a maximum LBT CW value.

19. The UE of claim 1, wherein the one or more processors, to adjust the at least one parameter, are configured to increase a value of the at least one parameter; and
wherein the one or more processors are further configured to set a listen-before-talk (LBT) contention window (CW) value to a minimum LBT CW value based at least in part on increasing the value of the at least one parameter.

20. The UE of claim 1, wherein the one or more processors, to adjust the at least one parameter of the adaptive ECW, are configured to adjust the at least one parameter of the adaptive ECW based at least in part on a channel busy ratio (CBR).

21. The UE of claim 20, wherein the one or more processors are further configured to receive a configuration that indicates a mapping associated with the CBR,
wherein the one or more processors, to adjust the at least one parameter of the adaptive ECW, are configured to adjust the at least one parameter of the adaptive ECW based at least in part on the mapping.

22. The UE of claim 21, wherein the mapping comprises at least one of:
a mapping from the CBR to an activation or deactivation of the adaptive ECW,
a mapping from the CBR to the at least one parameter of the adaptive ECW,
a mapping from the CBR to a minimum parameter value of the at least one parameter of the adaptive ECW,
a mapping from the CBR to a maximum parameter value of the at least one parameter of the adaptive ECW,
a binary exponential back-off associated with the at least one parameter of the adaptive ECW, or
a collision rate associated with the at least one parameter of the adaptive ECW.

23. The UE of claim 1, wherein the one or more processors are further configured to send, using a MAC layer of the UE, a sidelink sensing request to a physical layer of the UE, wherein the sidelink sensing request indicates, based at least in part on the adaptive ECW, at least one of a resource selection window (RSW) or a sensing window.

24. The UE of claim 23, wherein the sidelink sensing request indicates a first time period and a second time period,
wherein the first time period comprises an offset between a resource selection trigger and the RSW, and
wherein the second time period comprises a width of the RSW.

25. The UE of claim 24, wherein the second time period comprises a packet data budget associated with the MAC PDU.

26. The UE of claim 23, wherein the sidelink sensing request indicates the RSW based at least in part on an additional adaptive ECW, wherein the adaptive ECW is associated with an initial hybrid automatic repeat request (HARQ) transmission, and wherein the additional adaptive ECW is associated with a retransmission of the initial HARQ transmission.

27. The UE of claim 23, wherein the sidelink sensing request indicates an additional RSW based at least in part on an additional adaptive ECW, wherein the adaptive ECW is associated with an initial hybrid automatic repeat request (HARQ) transmission, and wherein the additional adaptive ECW is associated with a retransmission of the initial HARQ transmission.

28. The UE of claim 23, wherein the adaptive ECW is associated with an initial hybrid automatic repeat request (HARQ) transmission, and wherein the one or more processors are further configured to send, using the MAC layer of the UE, an additional sidelink sensing request to the physical layer of the UE, wherein the additional sidelink sensing request indicates, based at least in part on an additional adaptive ECW, an additional RSW, wherein the additional adaptive ECW is associated with a retransmission of the initial HARQ transmission.

29. A method of wireless communication performed by a user equipment (UE), comprising:

selecting, for a sidelink transmission over an unlicensed band and associated with a medium access control (MAC) protocol data unit (PDU), one or more candidate resources of a set of candidate resources that are within an adaptive effective contention window (ECW);

adjusting at least one parameter of the adaptive ECW to determine an adjusted at least one parameter based at least in part on a channel access output associated with the one or more candidate resources; and transmitting the MAC PDU using the one or more candidate resources or an additional one or more candidate resources, wherein the additional one or more candidate resources are selected based at least in part on the adjusted at least one parameter.

30. A non-transitory computer-readable medium storing a set of instructions for wireless communication, the set of instructions comprising:

one or more instructions that, when executed by one or more processors of a user equipment (UE), cause the UE to:

select, for a sidelink transmission over an unlicensed band and associated with a medium access control (MAC) protocol data unit (PDU), one or more candidate resources of a set of candidate resources that are within an adaptive effective contention window (ECW);

adjust at least one parameter of the adaptive ECW to determine an adjusted at least one parameter based at least in part on a channel access output associated with the one or more candidate resources; and transmit the MAC PDU using the one or more candidate resources or an additional one or more candidate resources, wherein the additional one or more candidate resources are selected based at least in part on the adjusted at least one parameter.

31. An apparatus for wireless communication, comprising:

means for selecting, for a sidelink transmission over an unlicensed band and associated with a medium access control (MAC) protocol data unit (PDU), one or more candidate resources of a set of candidate resources that are within an adaptive effective contention window (ECW);

means for adjusting at least one parameter of the adaptive ECW to determine an adjusted at least one parameter based at least in part on a channel access output associated with the one or more candidate resources; and means for transmitting the MAC PDU using the one or more candidate resources or an additional one or more candidate resources, wherein the additional one or more candidate resources are selected based at least in part on the adjusted at least one parameter.

\* \* \* \* \*